(12) United States Patent
Sikka et al.

(10) Patent No.: US 6,214,289 B1
(45) Date of Patent: Apr. 10, 2001

(54) IRON-CHROMIUM-SILICON ALLOYS FOR HIGH-TEMPERATURE OXIDATION RESISTANCE

(75) Inventors: Vinod K. Sikka, Oak Ridge; Joseph Vought, Rockwood; C. Randal Howell; Michael L. Santella, both of Knoxville, all of TN (US)

(73) Assignee: U. T. Battelle, Oak Ridge, TN (US)

( * ) Notice: Subject to any disclaimer, the term of this patent is extended or adjusted under 35 U.S.C. 154(b) by 0 days.

(21) Appl. No.: 09/397,247

(22) Filed: Sep. 16, 1999

(51) Int. Cl.$^7$ .................................................. C22C 38/34
(52) U.S. Cl. ............................................... 420/70; 420/68
(58) Field of Search ................................ 420/68, 70, 583; 148/325, 326

(56) References Cited

U.S. PATENT DOCUMENTS

| | | |
|---|---|---|
| 4,436,697 | 3/1984 | Friedrich et al. . |
| 4,474,732 | 10/1984 | Lynn . |
| 5,032,195 | 7/1991 | Shin et al. . |
| 5,662,864 * | 9/1997 | Kato et al. .............................. 420/583 |
| 5,709,836 * | 1/1998 | Fujisawa et al. ...................... 420/583 |

* cited by examiner

Primary Examiner—Deborah Yee
(74) Attorney, Agent, or Firm—Hardaway/Mann IP Group

(57) ABSTRACT

A body centered cubic and a highly oxidation and corrosive resistant Fe—Cr—Si-alloy.

18 Claims, 36 Drawing Sheets

Yield strength at 600°C as a function of silicon content for Fe-35 Cr-Si alloys. All of the specimens were tested after a 900°C anneal for 30 minutes.

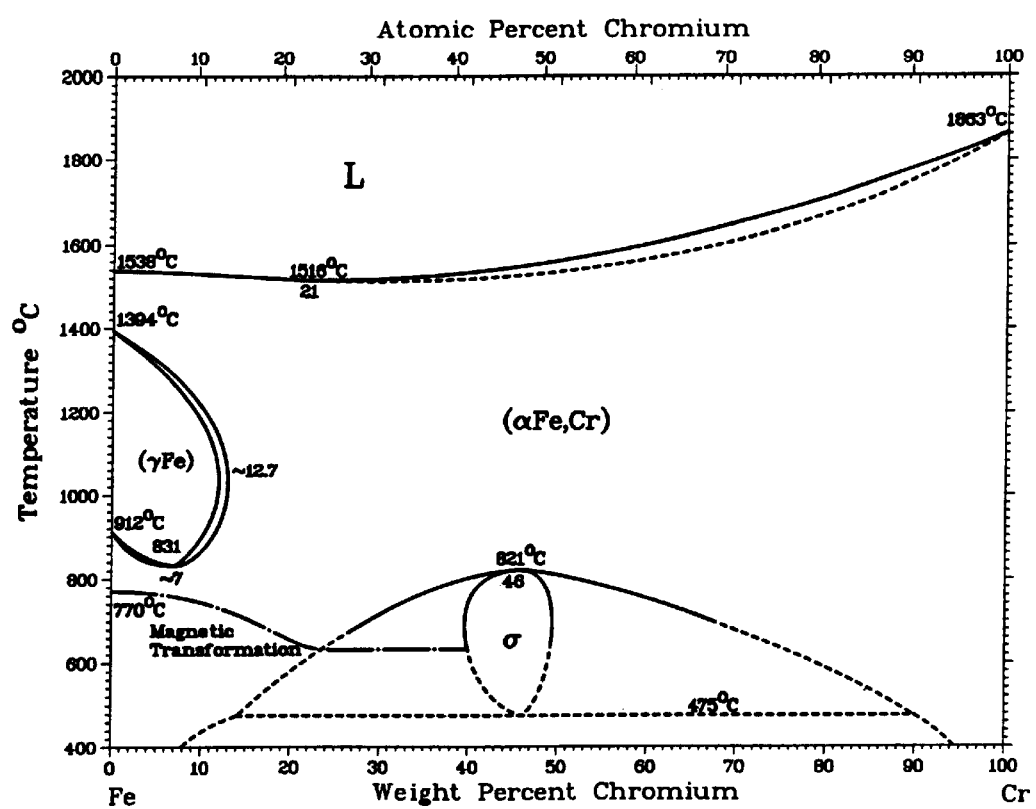
Fig. 1. Iron-chromium phase diagram.

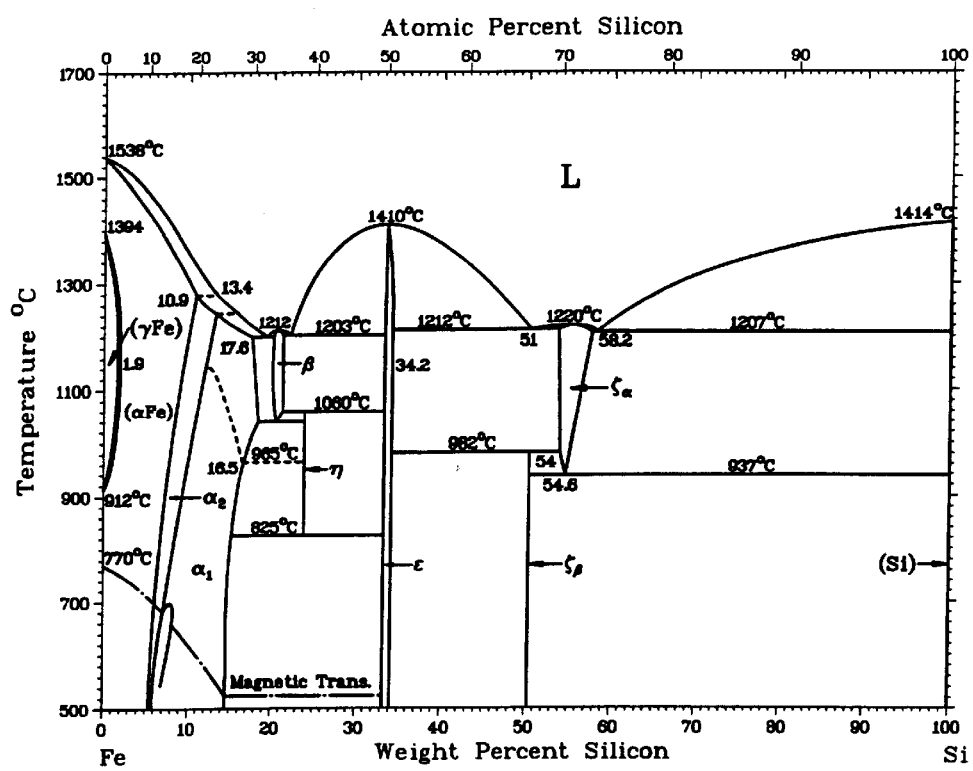
Fig. 2. Iron-silicon phase diagram.

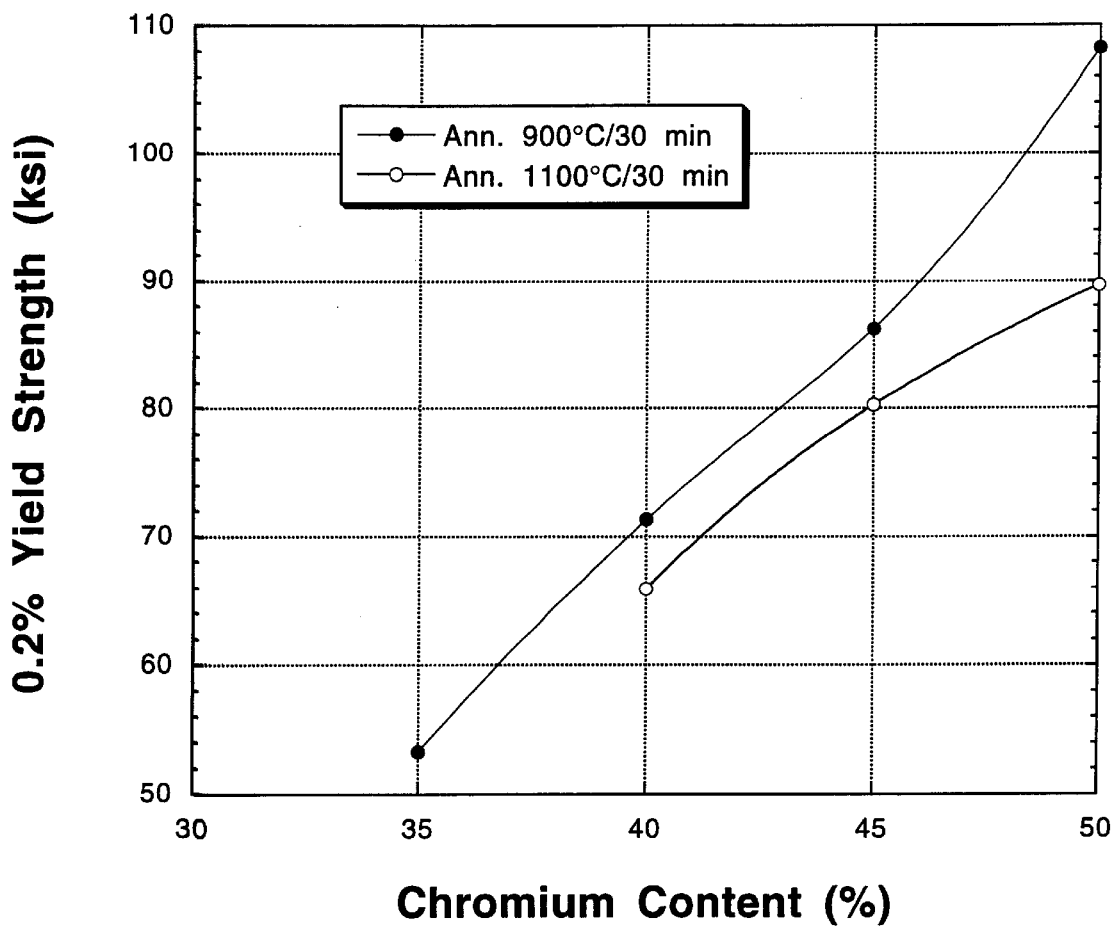
Fig. 3. Effect of chromium content and heat treatments of 900 and 1100°C for 30 minutes on room-temperature yield strength of Fe-Cr alloys.

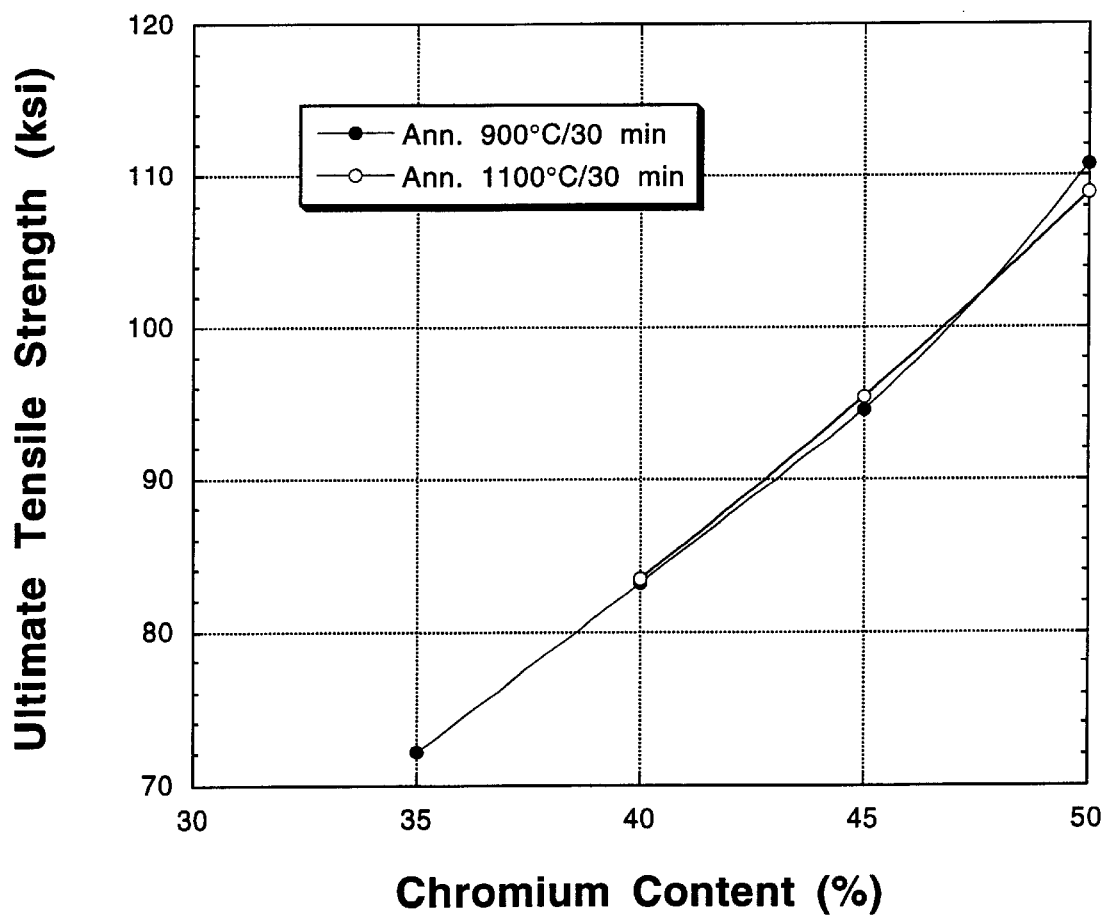
Fig. 4. Effect of chromium content and heat treatments of 900 and 1100°C for 30 minutes on room-temperature ultimate tensile strength of Fe-Cr alloys.

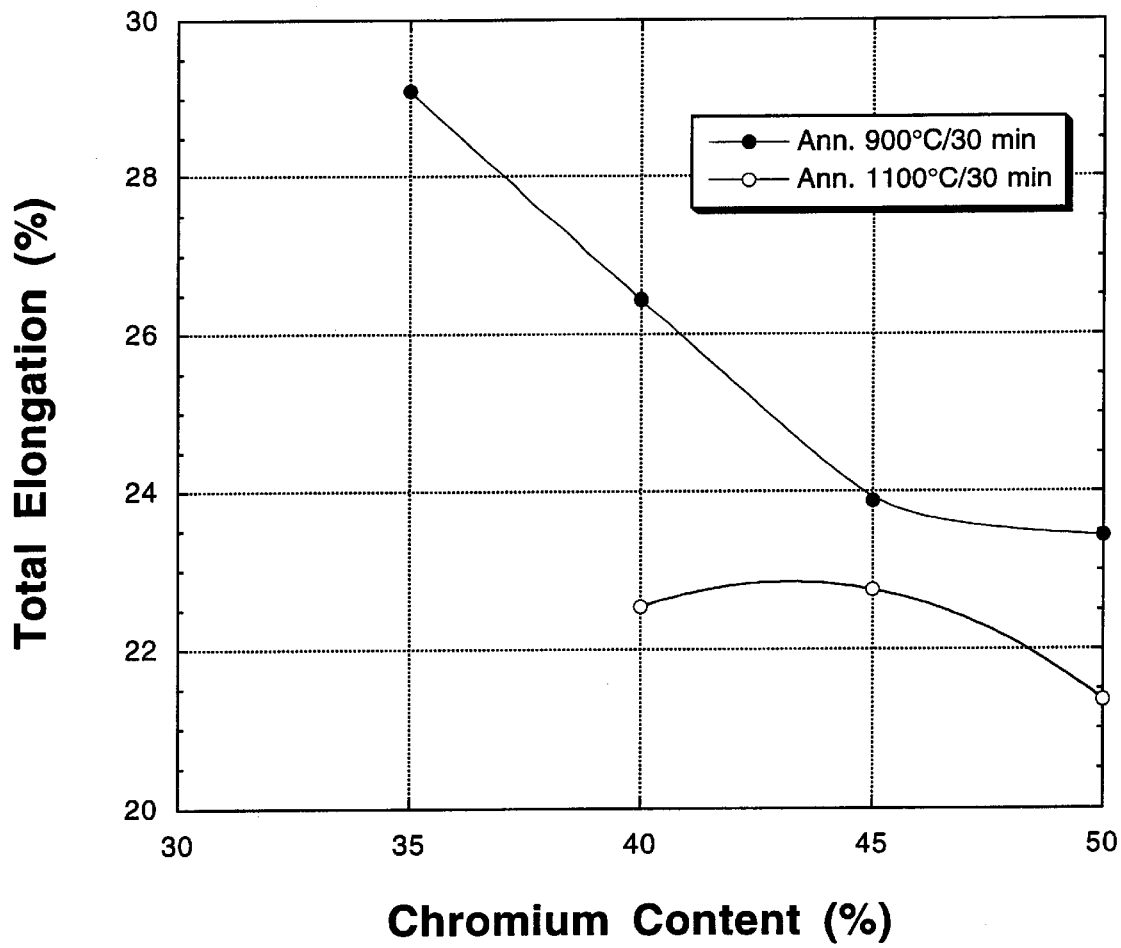
Fig. 5. Effect of chromium content and heat treatments of 900 and 1100°C for 30 minutes on room-temperature total elongation of Fe-Cr alloys.

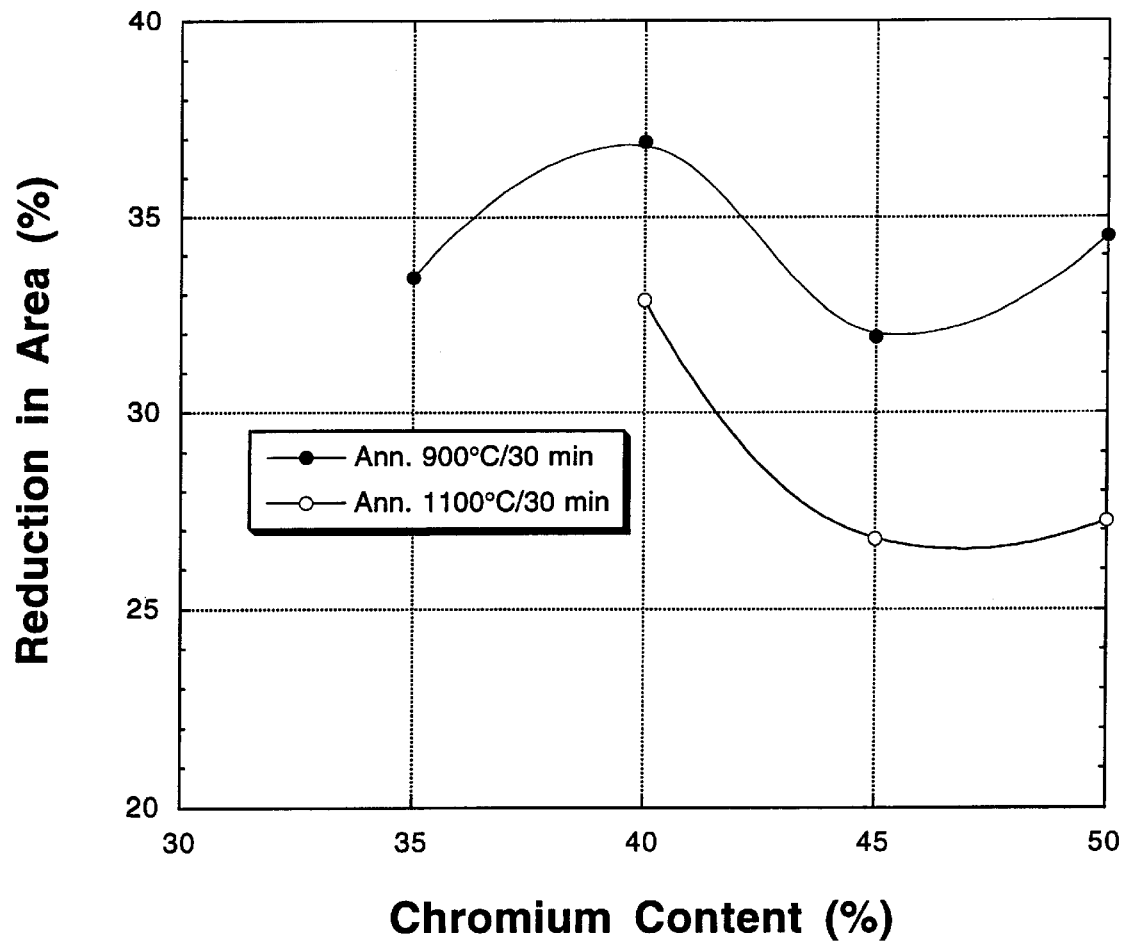
Fig. 6. Effect of chromium content and heat treatments of 900 and 1100°C for 30 minutes on room-temperature reduction of area of Fe-Cr alloys.

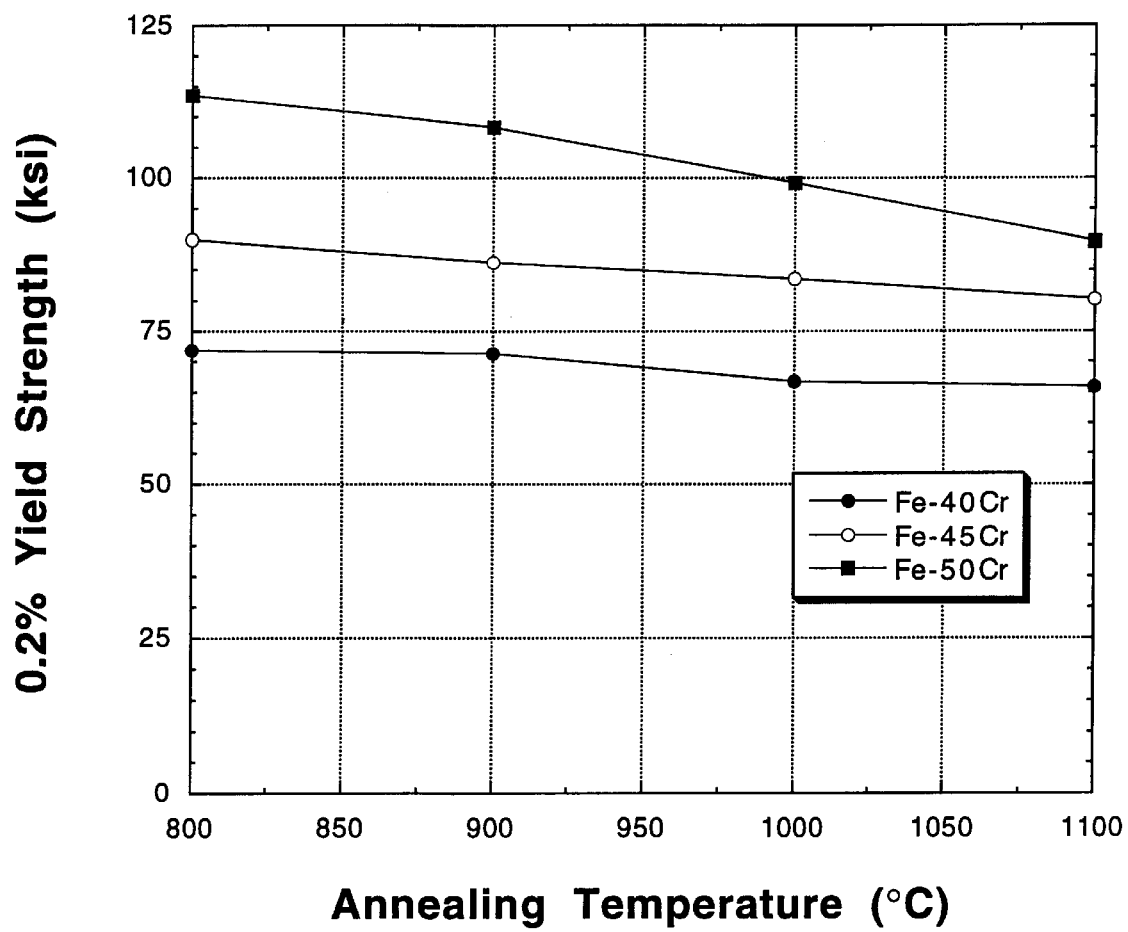
Fig. 7. Effect of annealing temperature on room-temperature yield strength of Fe-Cr alloys. All of the treatments were for 30 minutes.

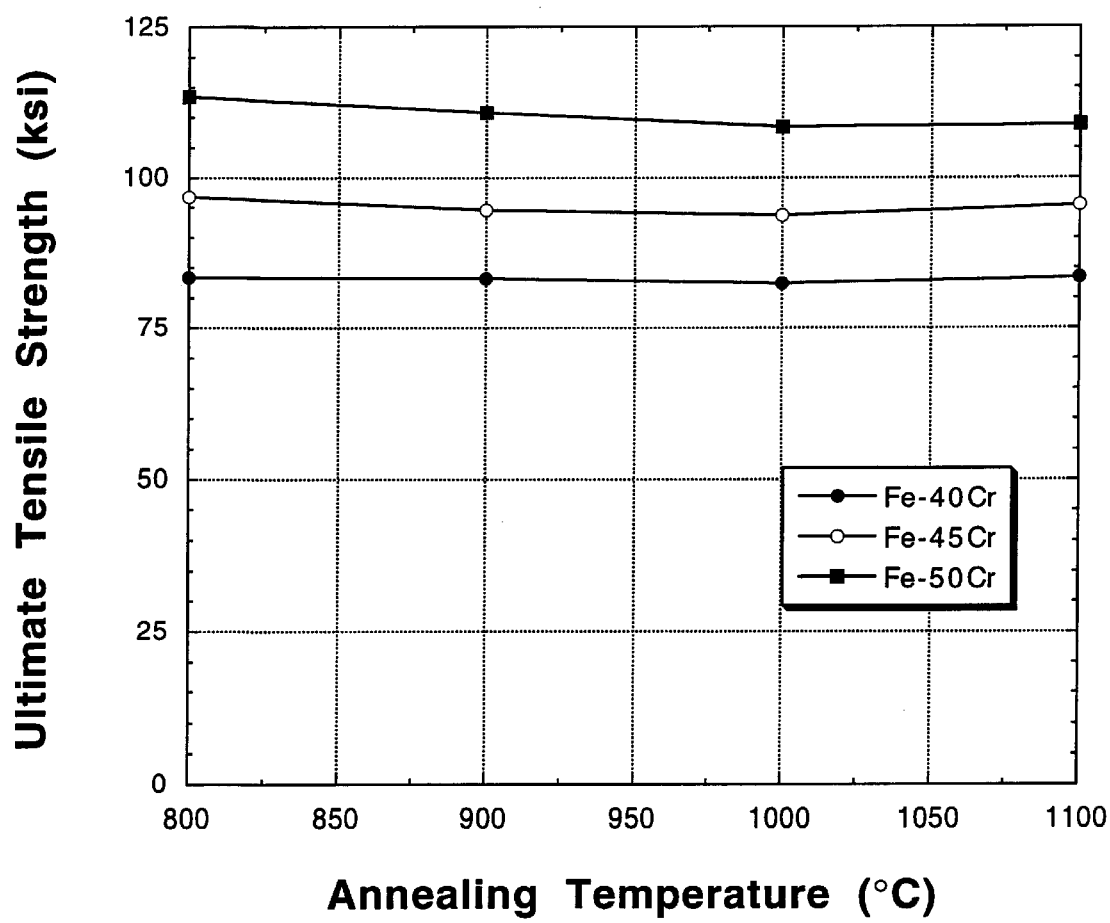
Fig. 8. Effect of annealing temperature on room-temperature ultimate tensile strength of Fe-Cr alloys. All of the treatments were for 30 minutes.

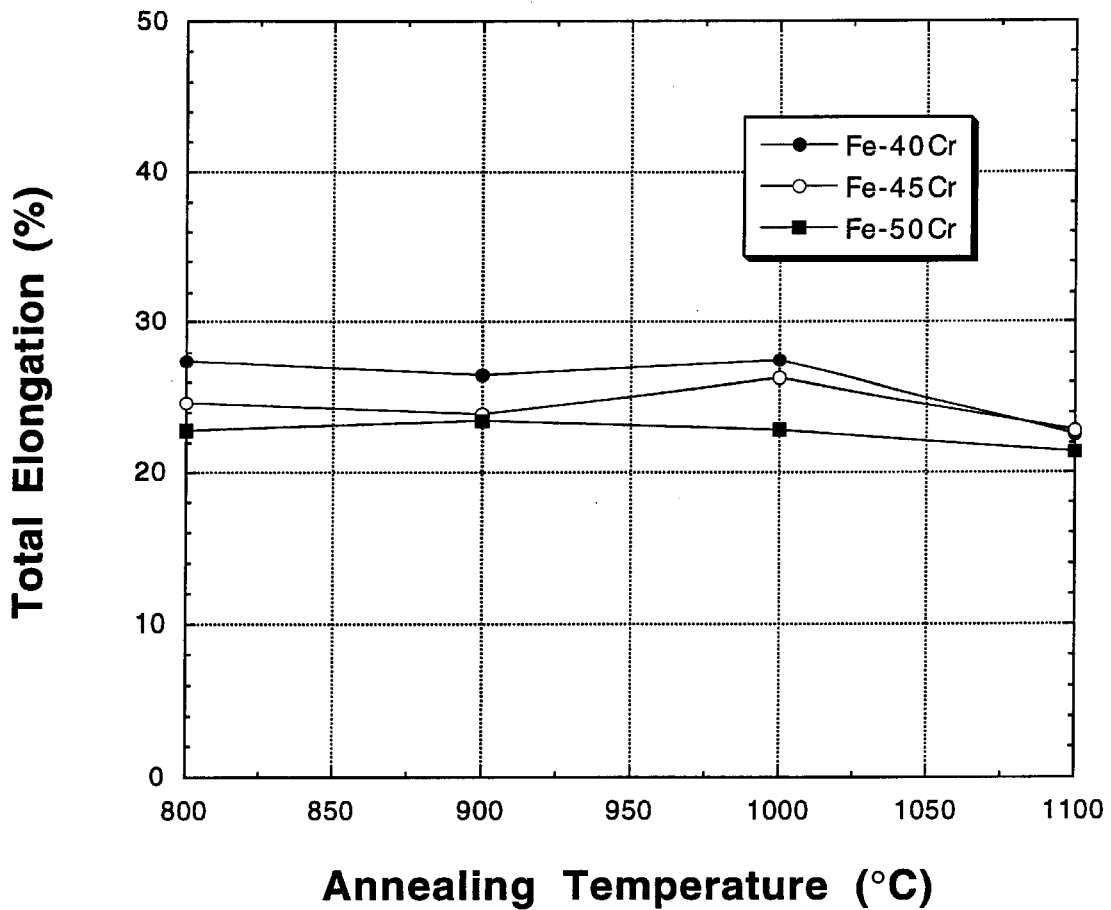
Fig. 9. Effect of annealing temperature on room-temperature total elongation of Fe-Cr alloys. All of the treatments were for 30 minutes.

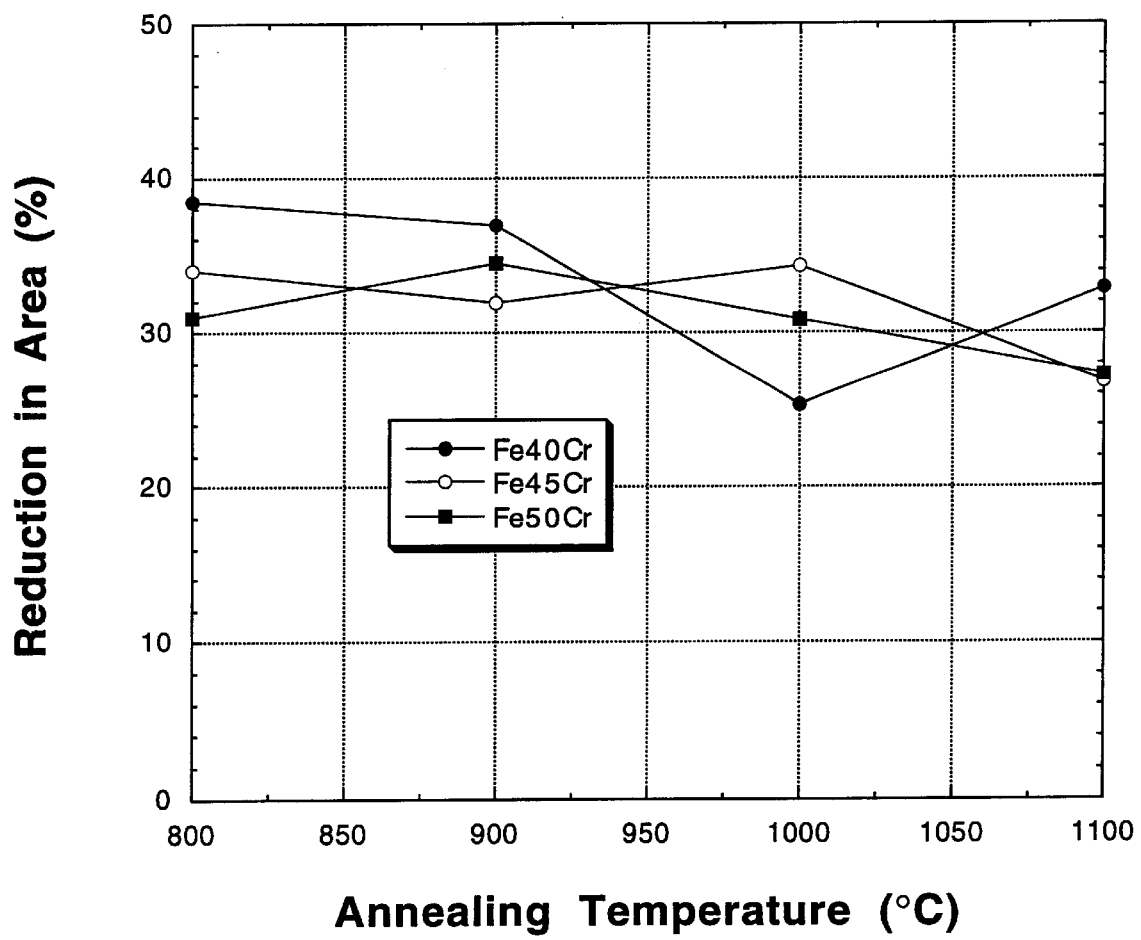
Fig. 10. Effect of annealing temperature on room-temperature reduction of area of Fe-Cr alloys. All of the treatments were for 30 minutes.

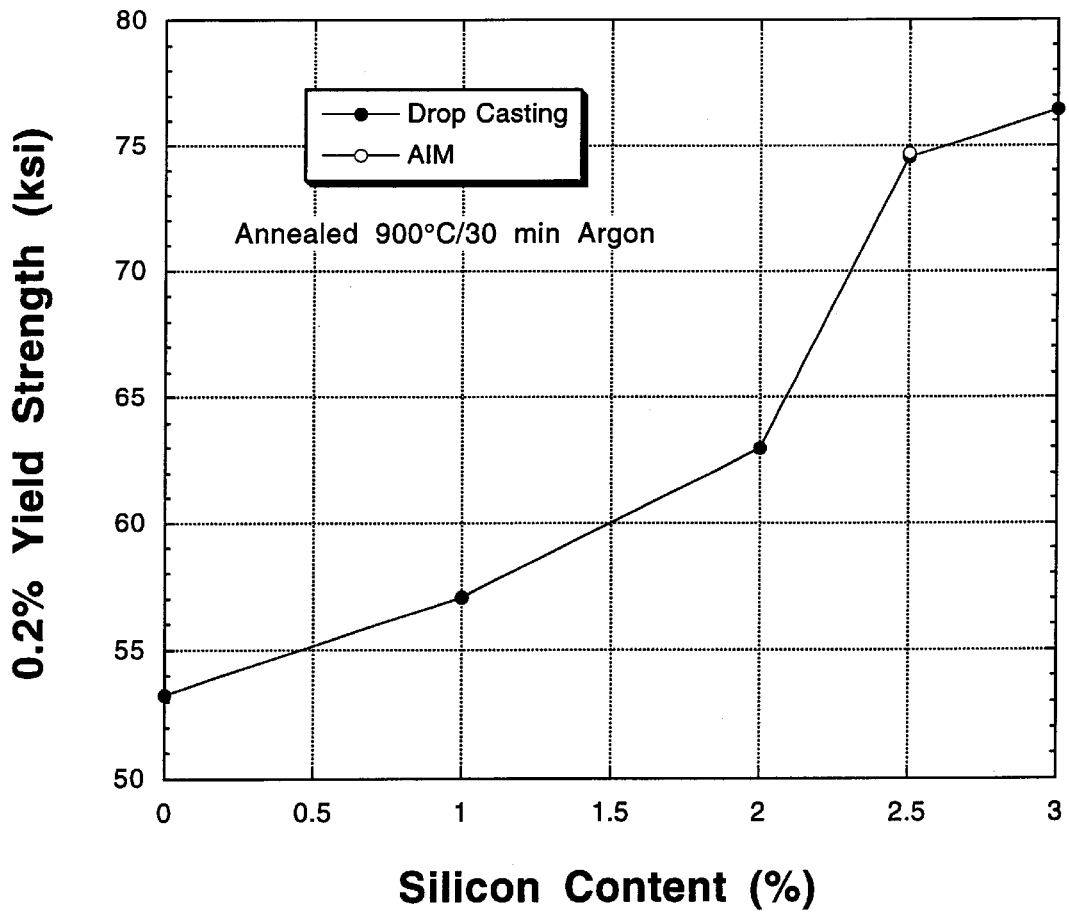
Fig. 11. Effect of silicon content on room-temperature yield strength of Fe-35 Cr-Si alloys. All of the data are for drop-cast heats. For Fe-35 Cr-2.5 Si, data are also included for a air-induction-melted 15-lb heat.

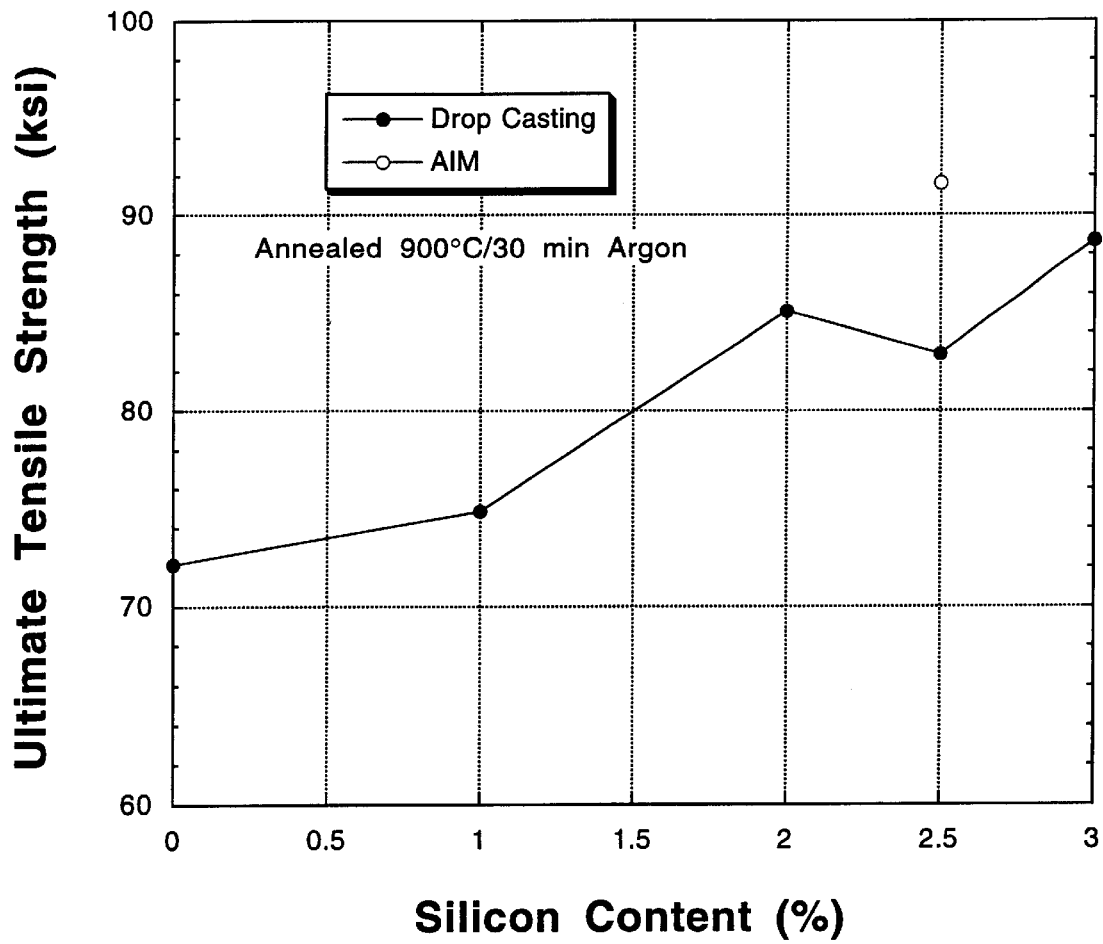
Fig. 12. Effect of silicon content on room-temperature ultimate tensile strength of Fe-35 Cr-Si alloys. All of the data are for drop-cast heats. For Fe-35 Cr-2.5 Si, data are also included for a air-induction-melted 15-lb heat.

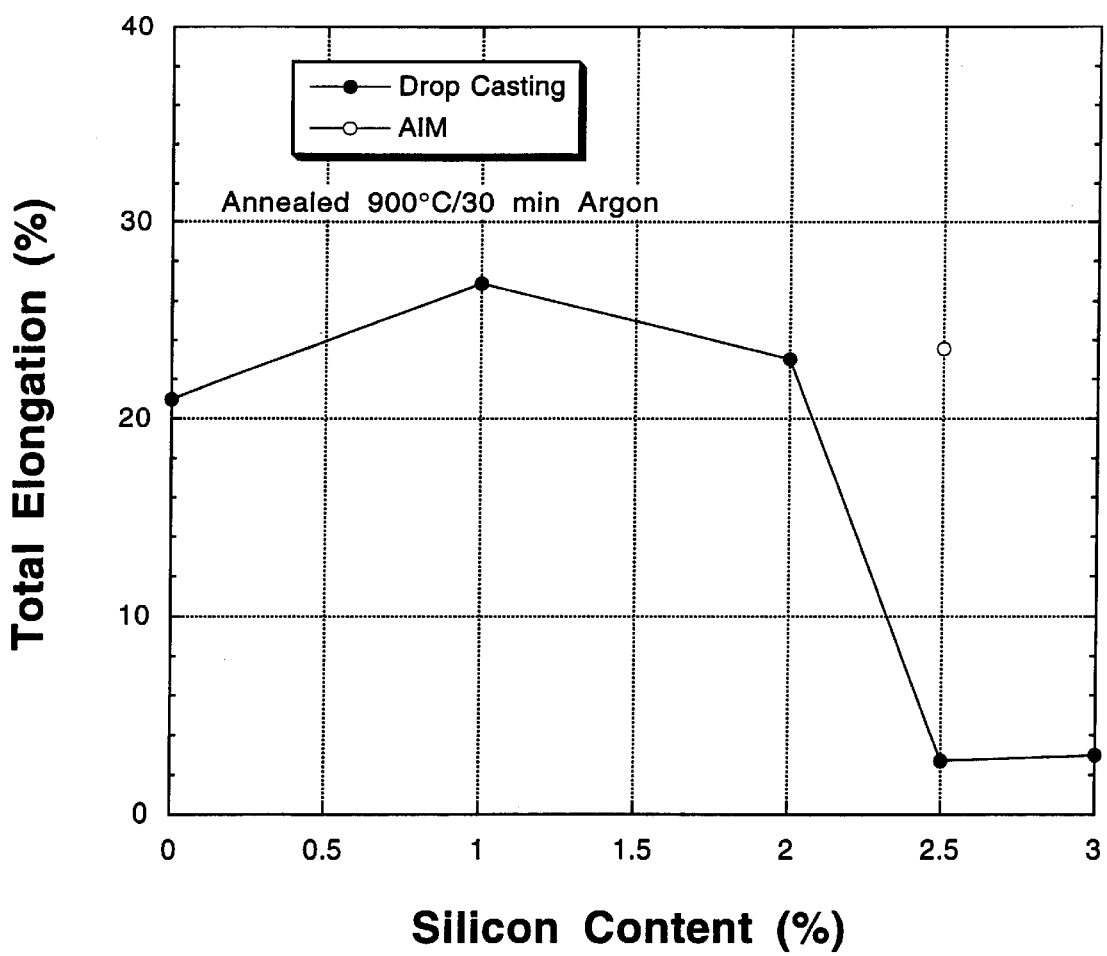
Fig. 13. Effect of silicon content on room-temperature total elongtion of Fe-35 Cr-Si alloys. All of the data are for drop-cast heats. For Fe-35 Cr-2.5 Si, data are also included for a air-induction-melted 15-lb heat.

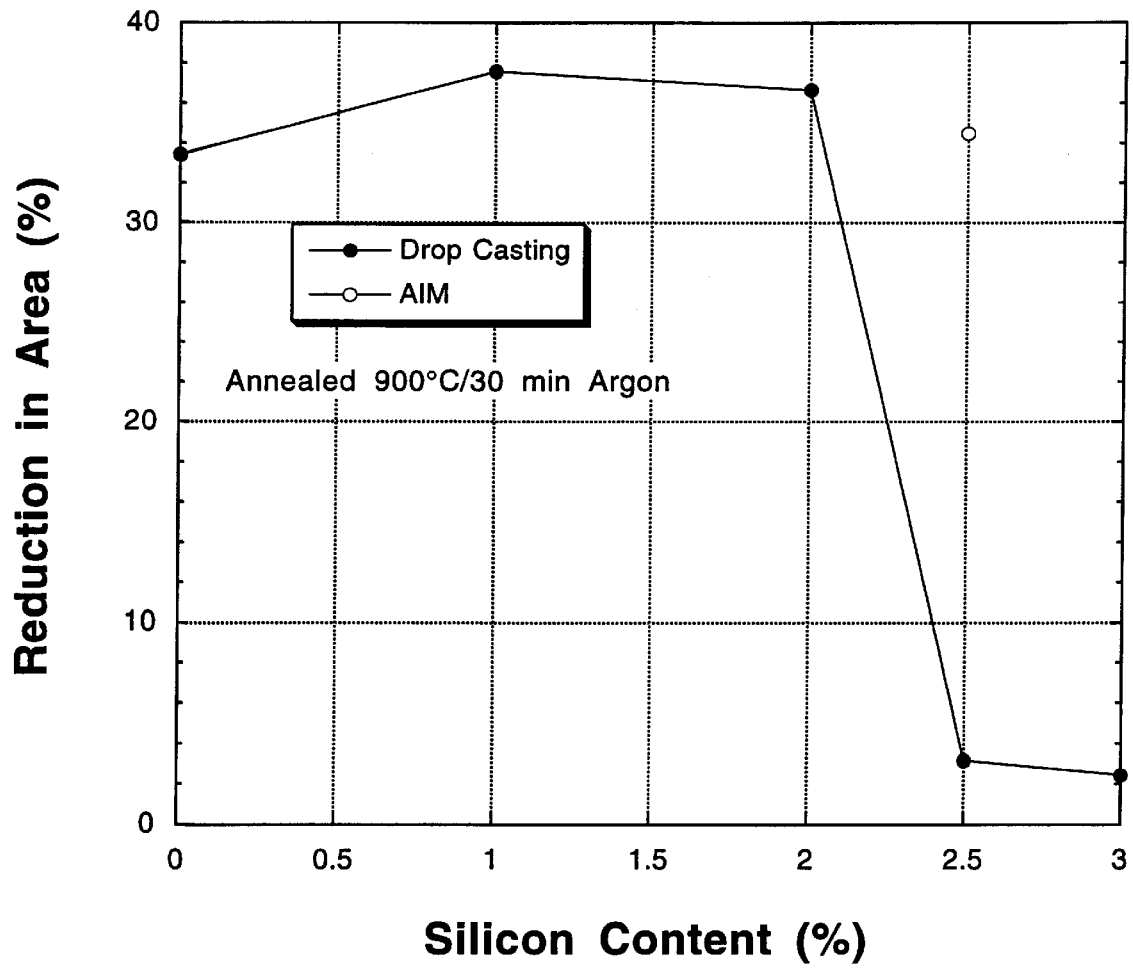
Fig. 14. Effect of silicon content on room-temperature reduction of area of Fe-35 Cr-Si alloys. All of the data are for drop-cast heats. For Fe-35 Cr-2.5 Si, data are also included for a air-induction-melted 15-lb heat.

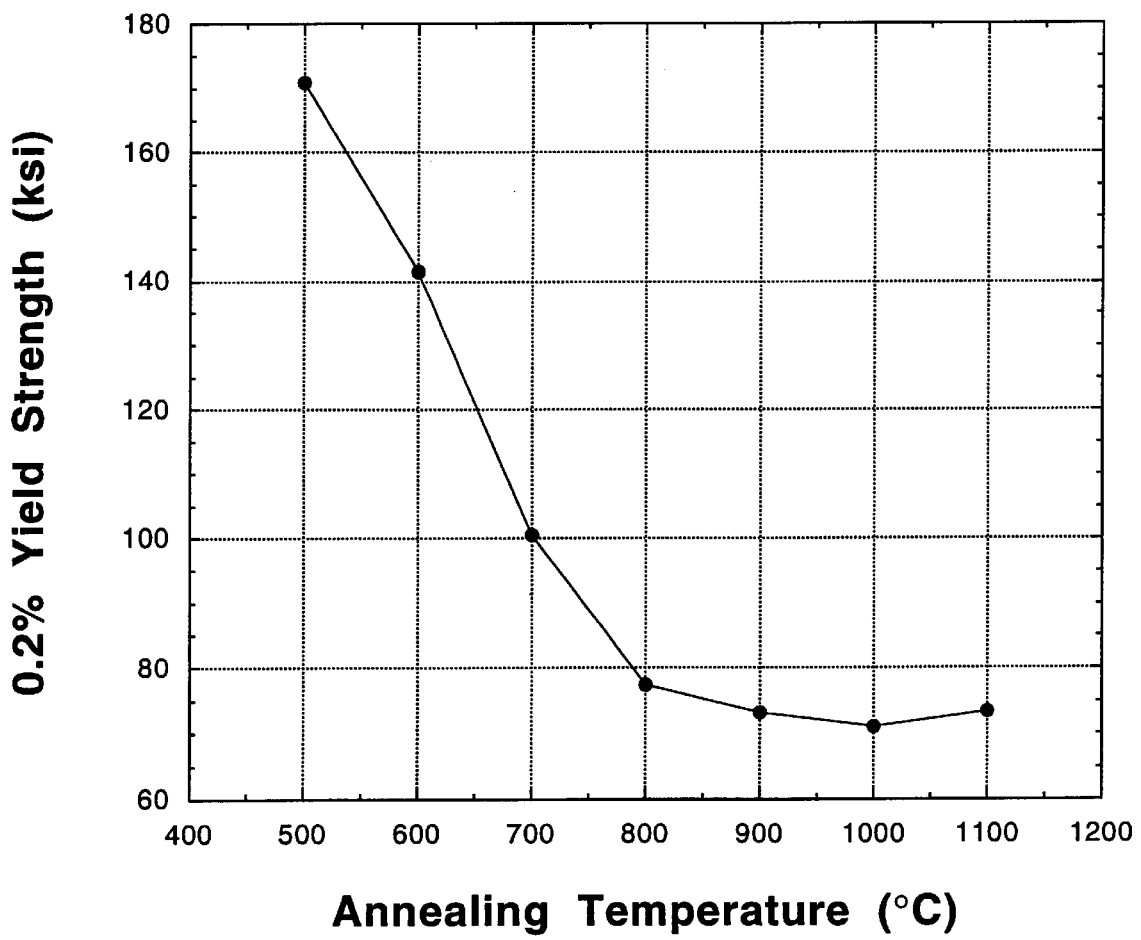
Fig. 15. Effect of annealing temperature on room-temperature yield strength of air-induction-melted Fe-35 Cr-2.5 Si alloy.

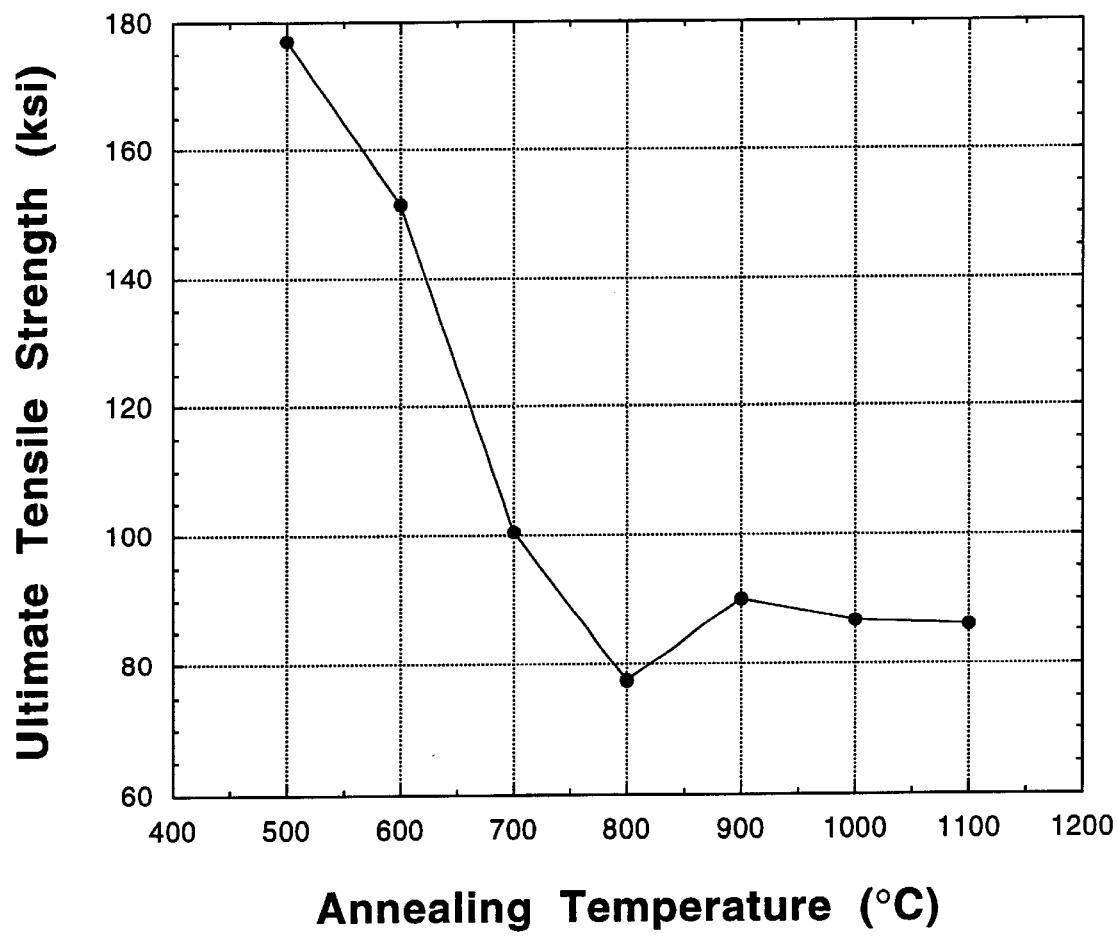
Fig. 16. Effect of annealing temperature on room-temperature ultimate tensile strength of air-induction-melted Fe-35 Cr-2.5 Si alloy.

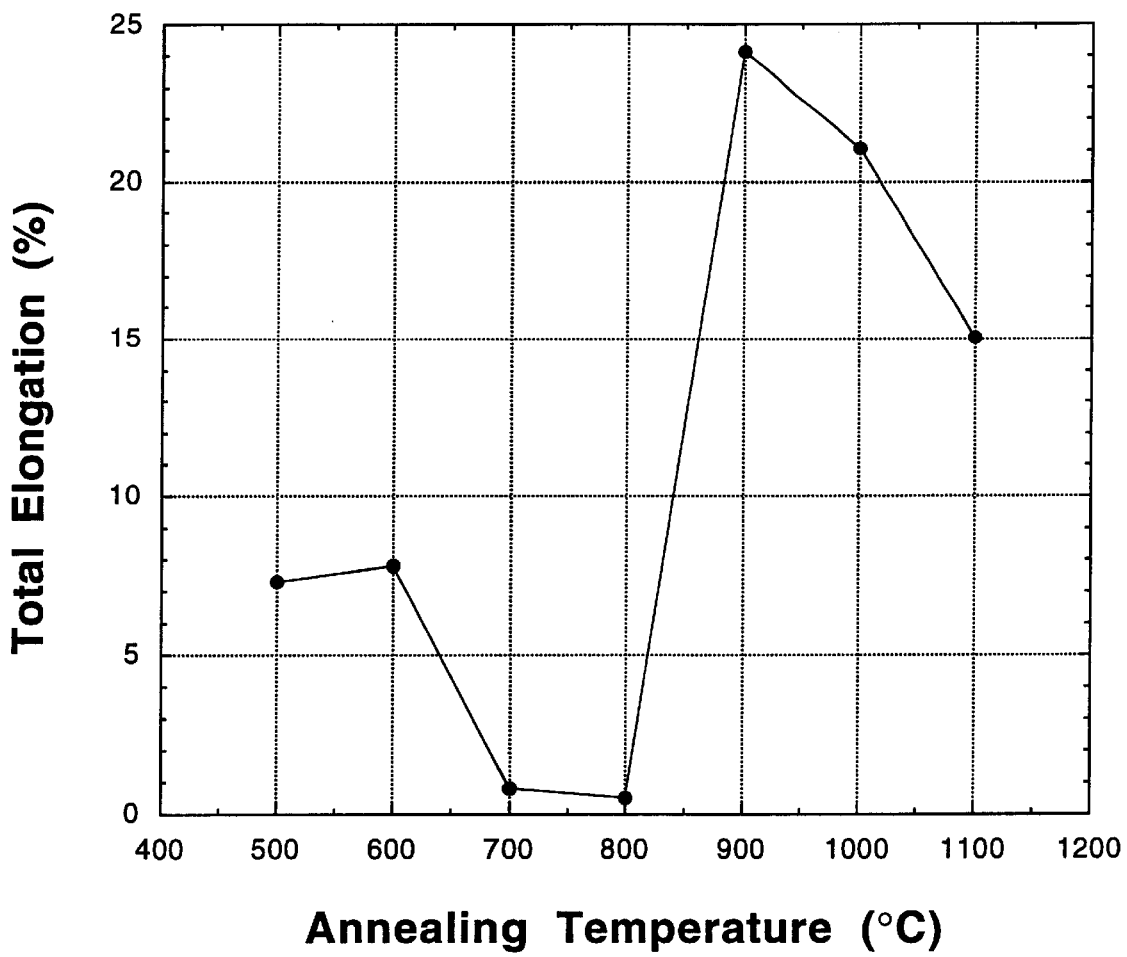
Fig. 17. Effect of annealing temperature on room-temperature total elongation of air-induction-melted Fe-35 Cr-2.5 Si alloy.

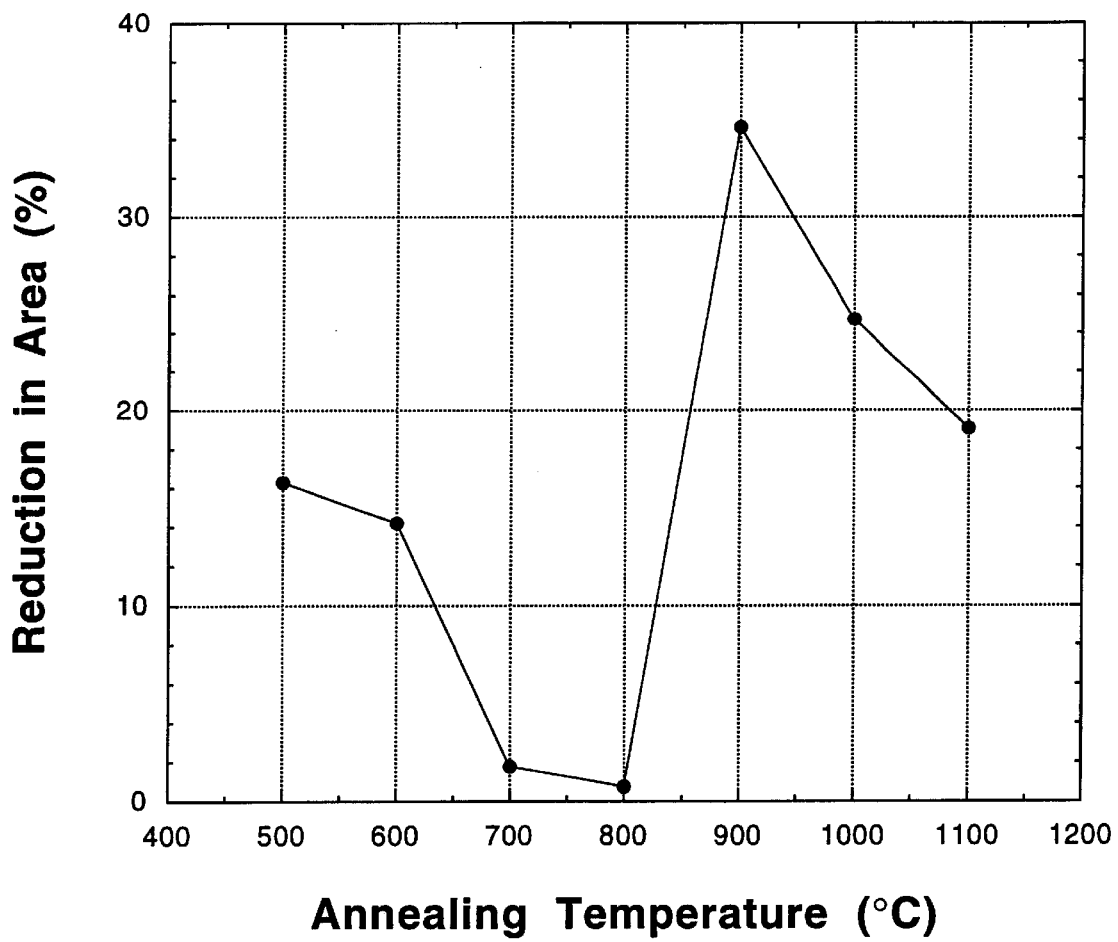
Fig. 18. Effect of annealing temperature on room-temperature reduction of area of air-induction-melted Fe-35 Cr-2.5 Si alloy.

5. DETAILED DESCRIPTION OF THE INVENTION: (Continued)
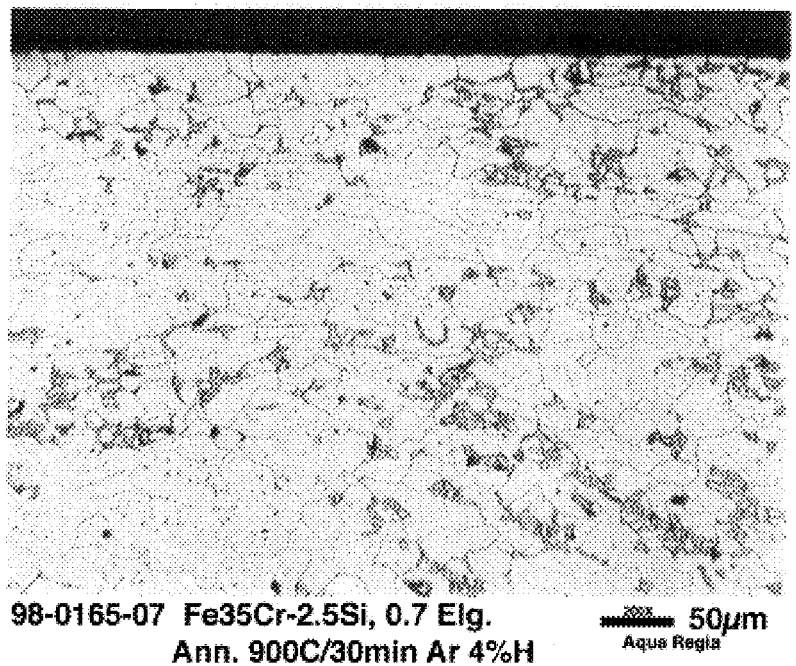
98-0165-07 Fe35Cr-2.5Si, 0.7 Elg.
Ann. 900C/30min Ar 4%H
50μm Aqua Regia
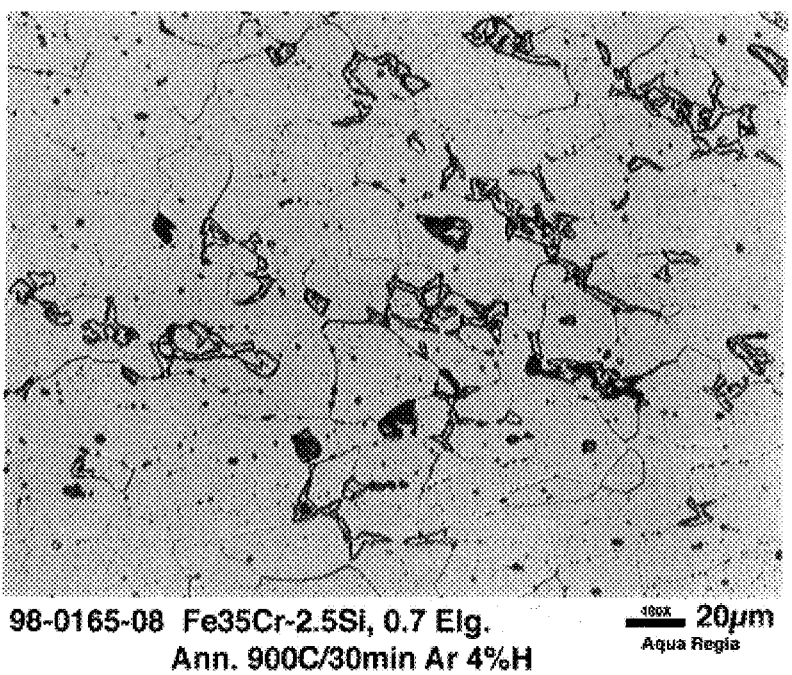
98-0165-08 Fe35Cr-2.5Si, 0.7 Elg.
Ann. 900C/30min Ar 4%H
20μm Aqua Regia
Fig. 19. Optical microstructure of room-temperature tensile-tested specimen of air-induction melted Fe-35 Cr-2.5 Si alloy. The specimen was annealed at 900°C for 30 minutes but showed a total elongation of 0.7%. Note the presence of σ-phase.

5. DETAILED DESCRIPTION OF THE INVENTION: (Continued)
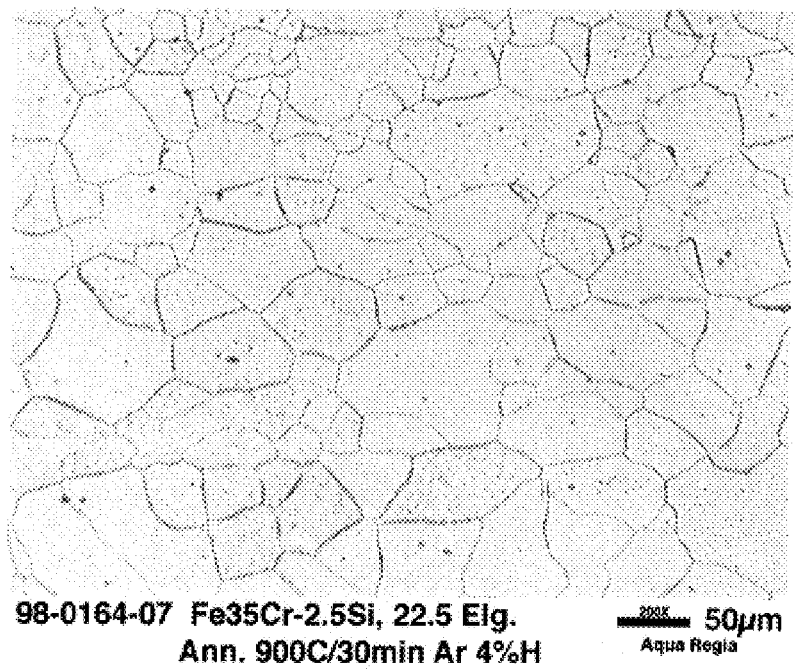
98-0164-07 Fe35Cr-2.5Si, 22.5 Elg.
Ann. 900C/30min Ar 4%H
50μm
Aqua Regia
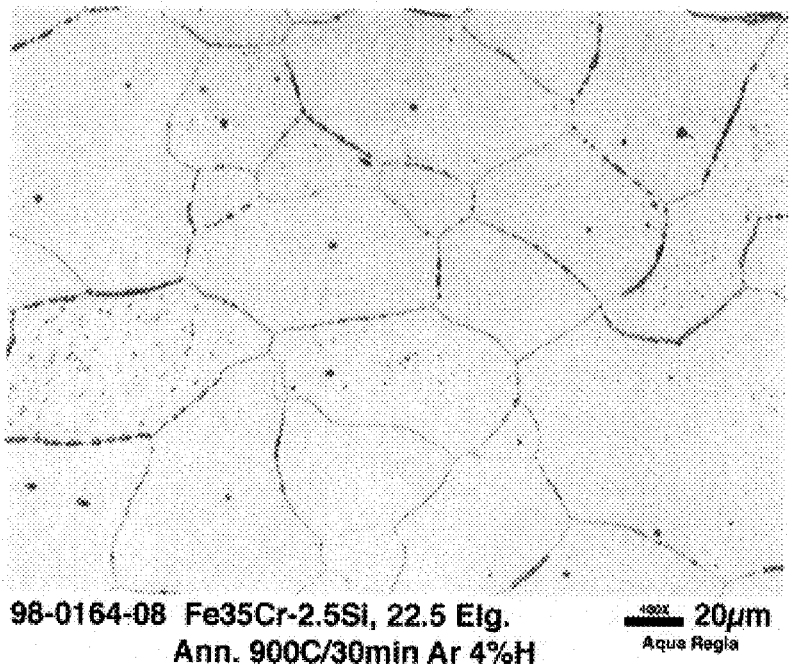
98-0164-08 Fe35Cr-2.5Si, 22.5 Elg.
Ann. 900C/30min Ar 4%H
20μm
Aqua Regia
Fig. 20. Optical microstructure of room-temperature tensile-tested specimen of air-induction-melted Fe-35 Cr-2.5 Si alloy. The specimen was annealed at 900°C for 30 minutes but showed a total elongtaion of 22.5%. Note the absence of σ-phase.

5. DETAILED DESCRIPTION OF THE INVENTION: (Continued)

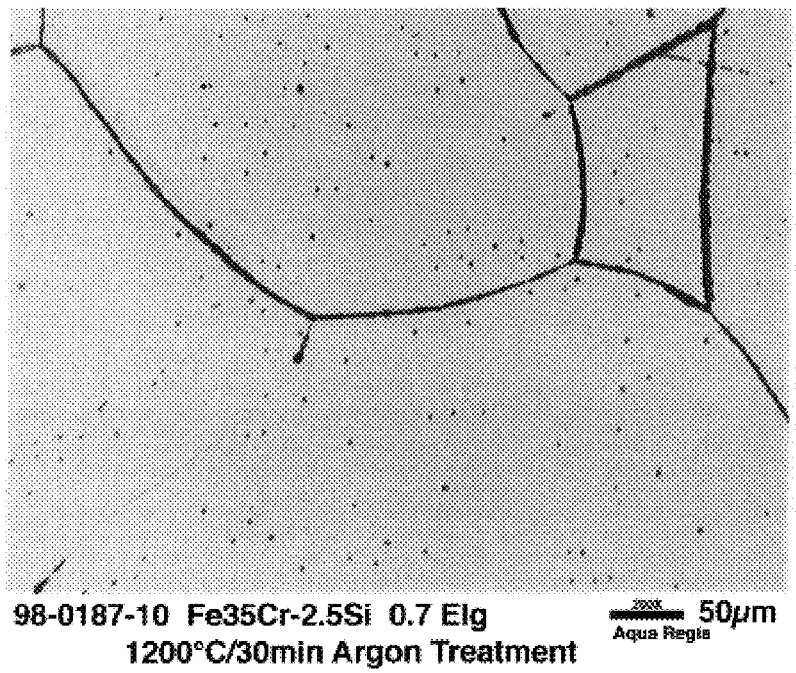

98-0187-10 Fe35Cr-2.5Si 0.7 Elg
1200°C/30min Argon Treatment
50μm
Aqua Regia

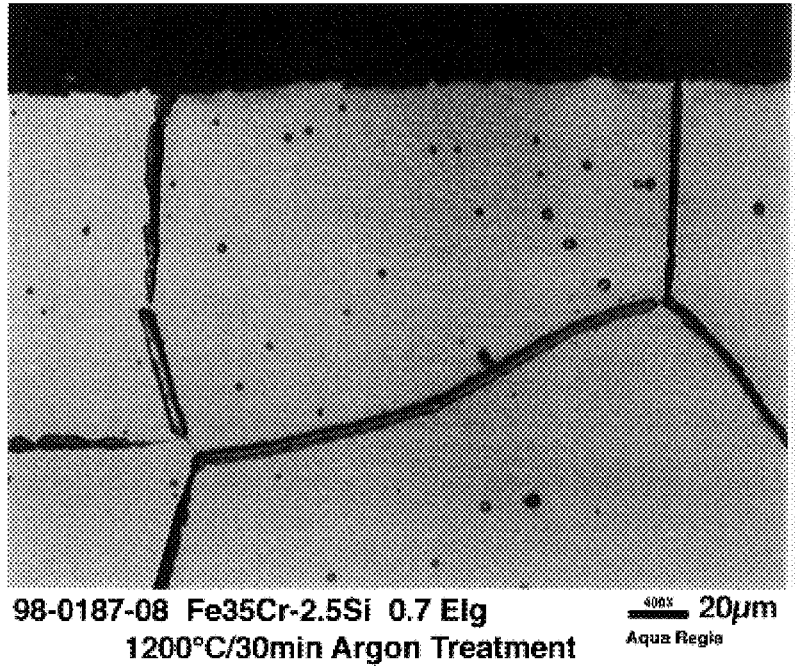

98-0187-08 Fe35Cr-2.5Si 0.7 Elg
1200°C/30min Argon Treatment
20μm
Aqua Regia

Fig. 21. Optical microstructure of room-temperature tensile-tested specimen of air-induction-melted Fe-35 Cr-2.5 Si alloy. The specimen of 0.7% elongation was annealed at 1200°C for 30 minutes to determine if the σ-phase would go into solution. This heat treatment eliminated the σ-phase but was too high for a large grain growth.

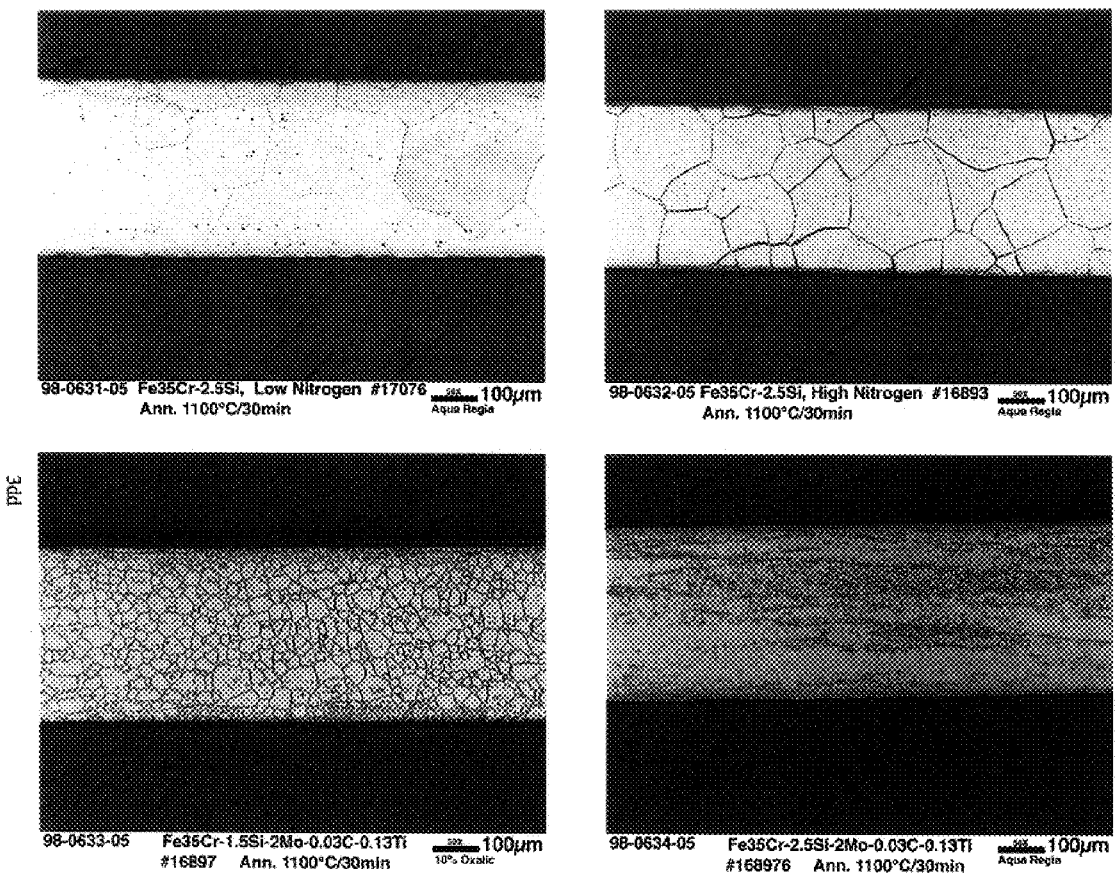
Fig. 22. Effect of 1100°C for 30-minute treatment on grain size of Fe-35 Cr-Si alloys: (a) coarsest grain size for the lowest nitrogen content, (b) finer grain size for the higher nitrogen content, (c) further grain refinement for titanium and carbon containing Fe-35 Cr-1.5 Si-2 Mo alloy, and (d) fine grain size banded structure for Fe-35 Cr-2.5 Si-2 Mo-0.03 C-0.13 Ti alloy.

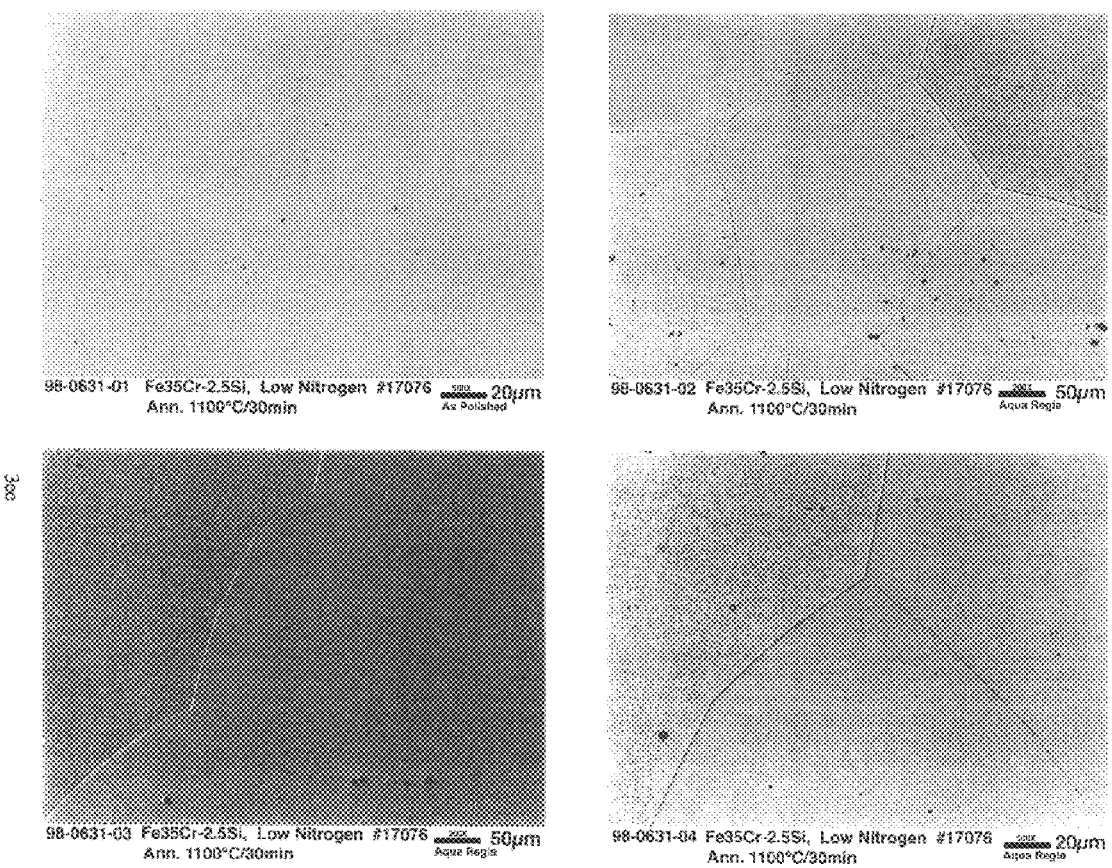
Fig. 23. Detailed microstructure of vacuum-induction-melted Fe-35 Cr-2.5 Si alloy with very low nitrogen content.

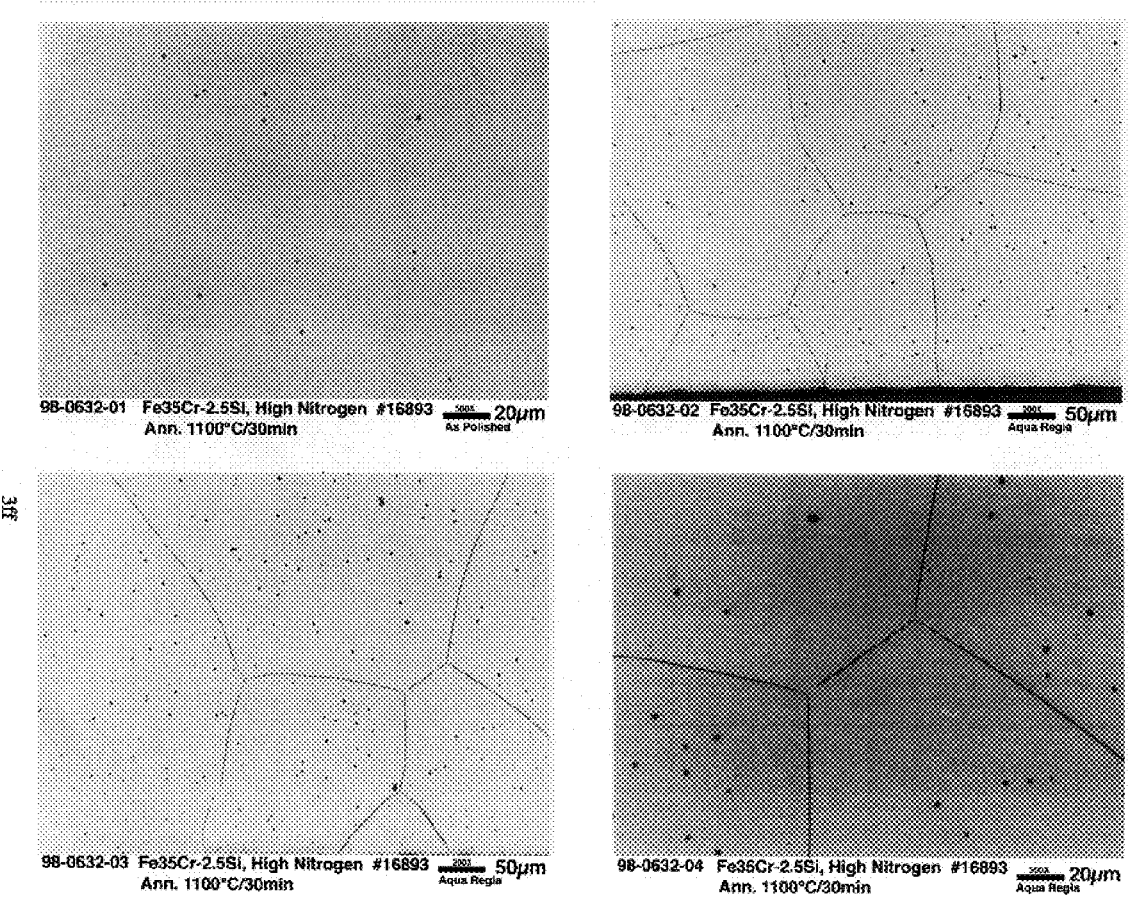
Fig. 24. Detailed microstructure of air-induction-melted Fe-35 Cr-2.5 Si alloy with high nitrogen content.

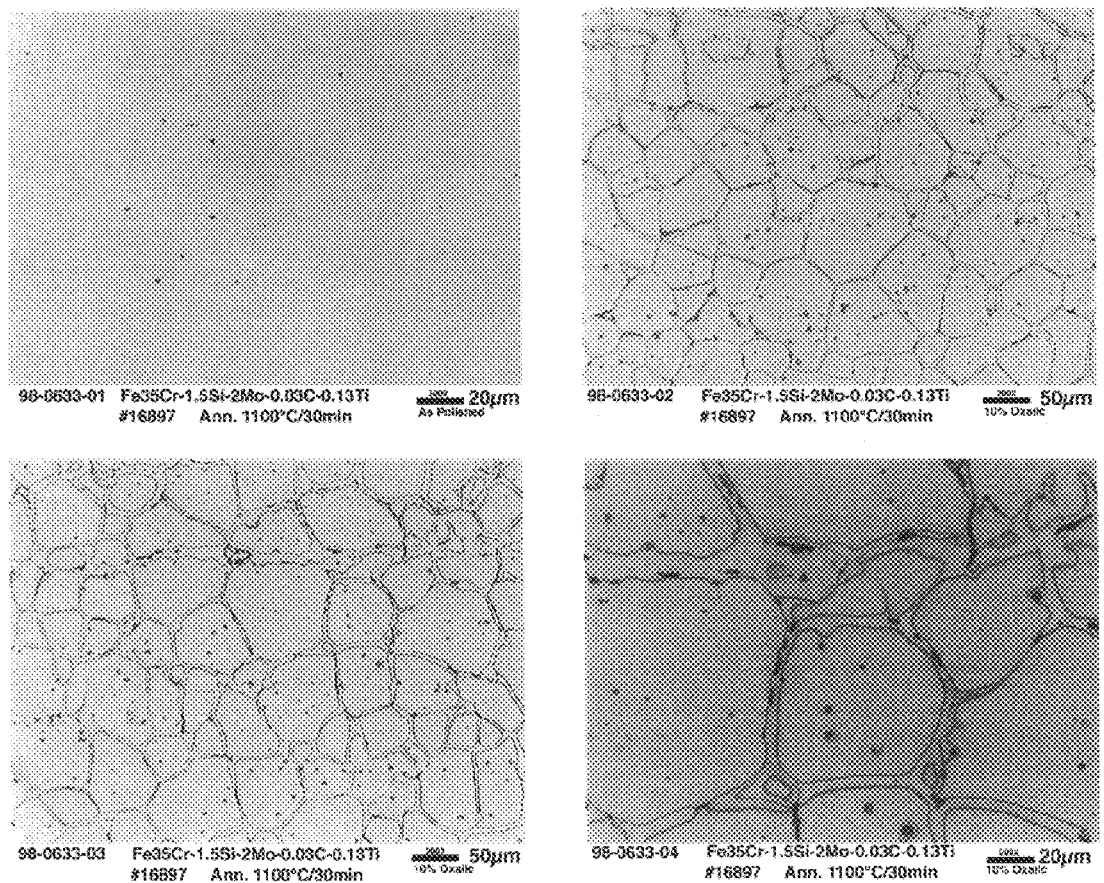
Fig. 25. Detailed microstructure of drop-cast Fe-35 Cr-1.5 Si-2 Mo-0.03 C-0.13 Ti alloy.

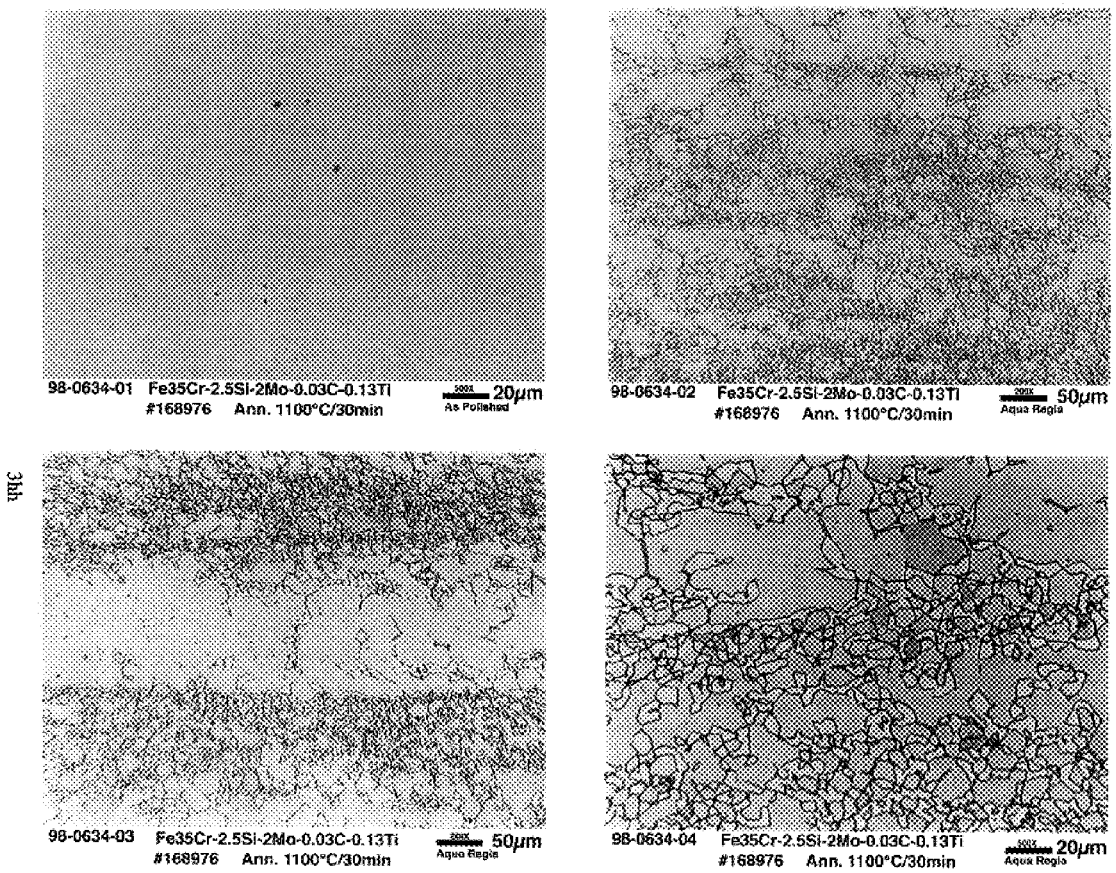
Fig. 26. Detailed microstructure of drop-cast Fe-35 Cr-2.5 Si-2 Mo-0.03 C-0.13 Ti alloy.

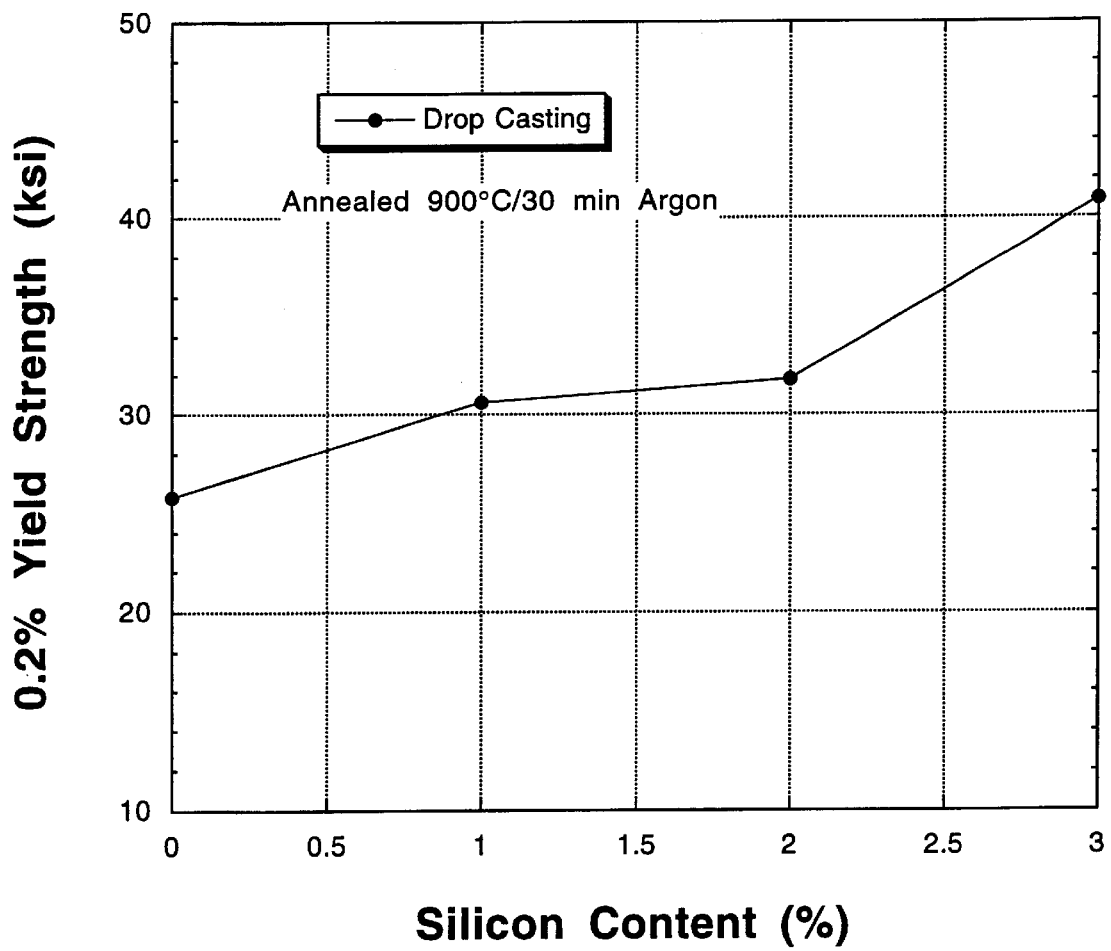
Fig. 27. Yield strength at 600°C as a function of silicon content for Fe-35 Cr-Si alloys. All of the specimens were tested after a 900°C anneal for 30 minutes.

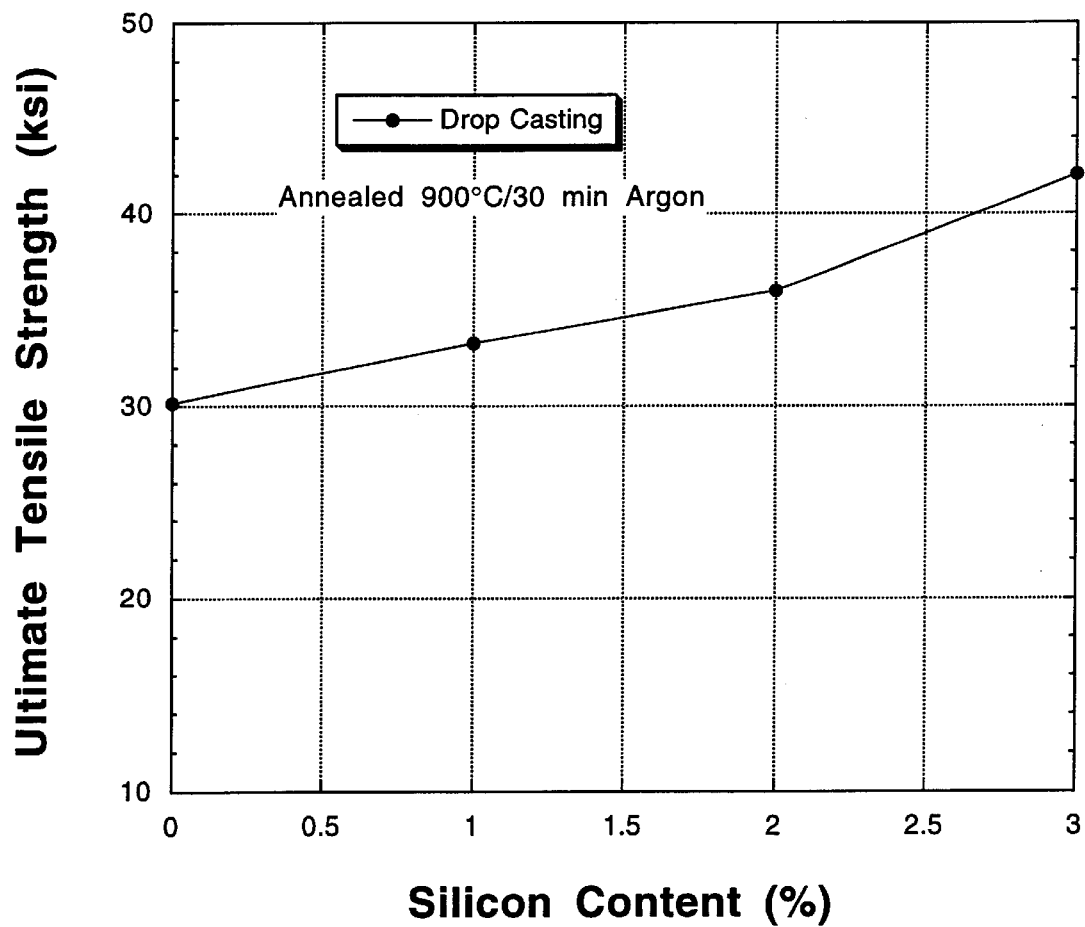
Fig. 28. Ultimate tensile strength at 600°C as a function of silicon content for Fe-35 Cr-Si alloys. All of the specimens were tested after a 900°C anneal for 30 minutes.

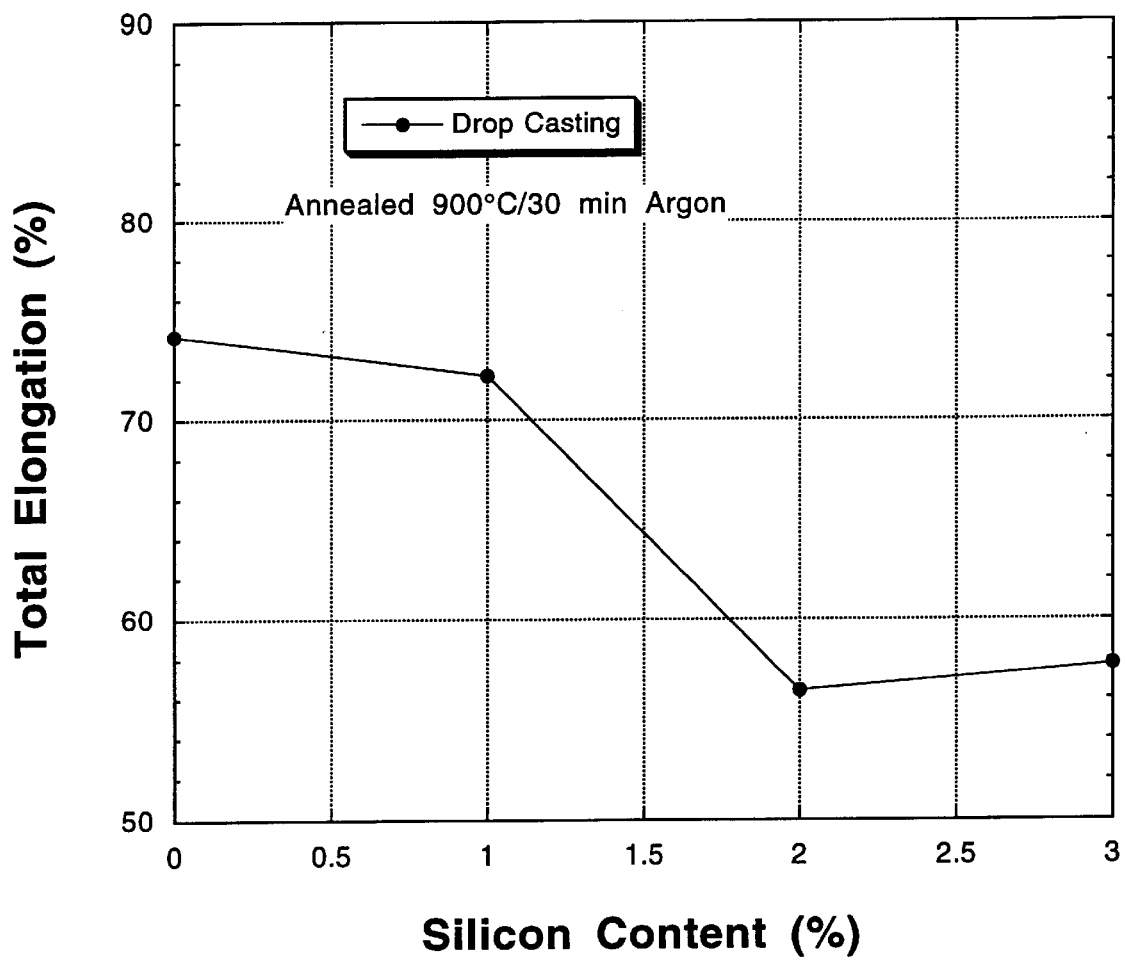
Fig. 29. Total elongation at 600°C as a function of silicon content for Fe-35 Cr-Si alloys. All of the specimens were tested after a 900°C anneal for 30 minutes.

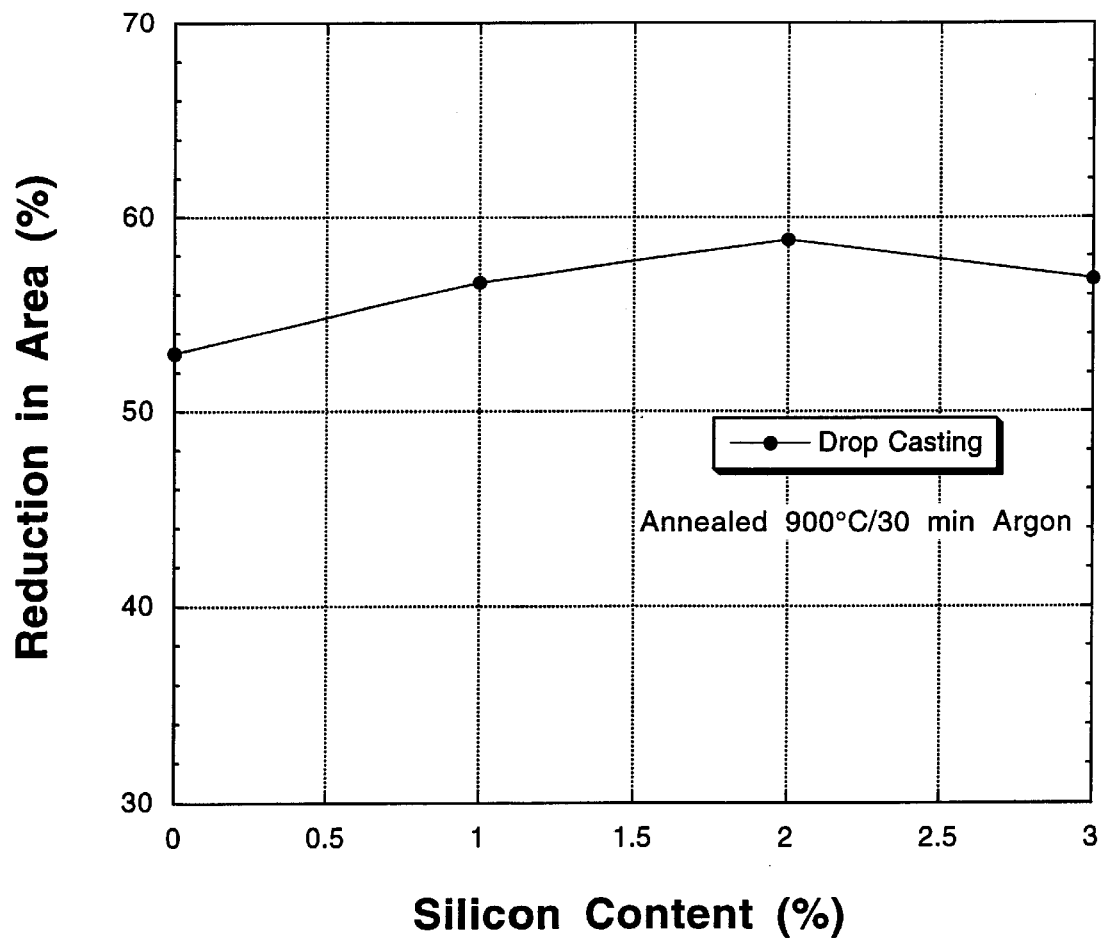
Fig. 30. Reduction of area at 600°C as a function of silicon content for Fe-35 Cr-Si alloys. All of the specimens were tested after a 900°C anneal for 30 minutes.

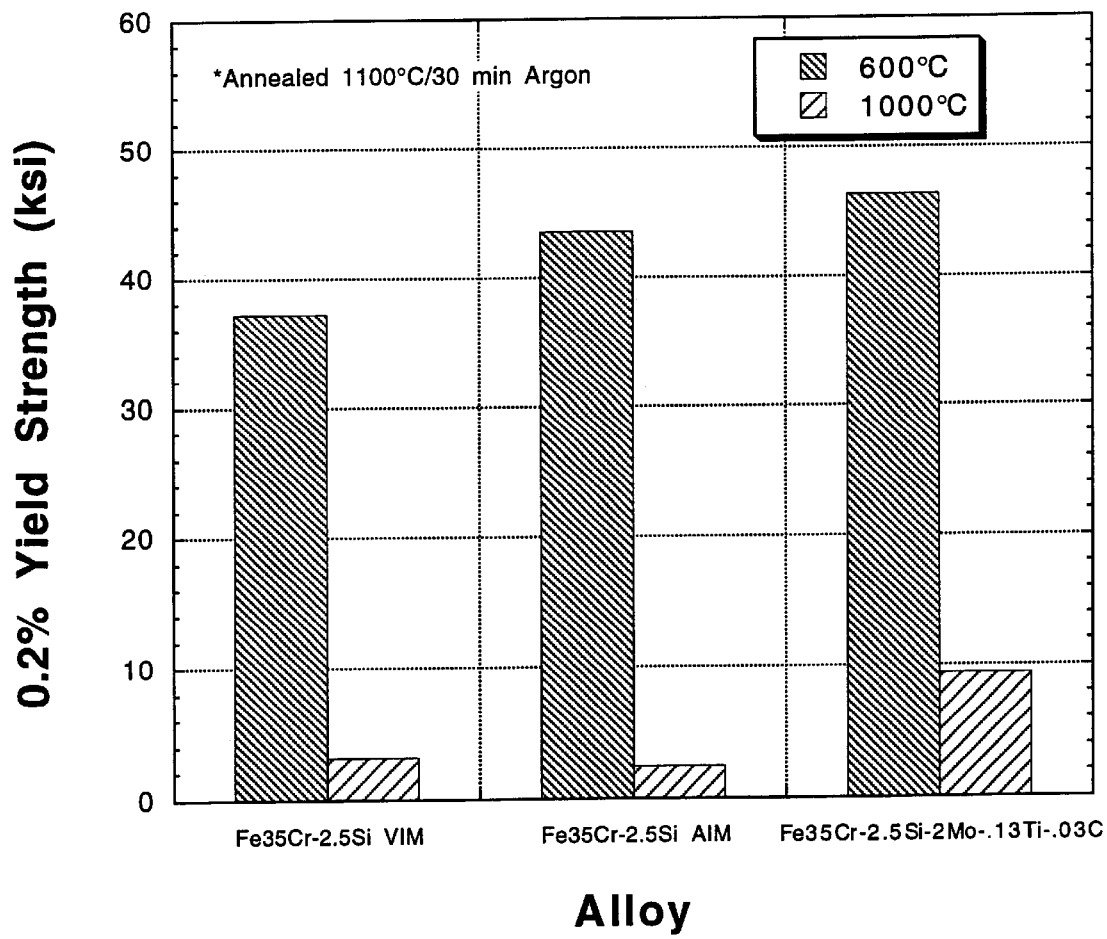
Fig. 31. Comparison of yield strength at 600 and 1000°C of three Fe-35 Cr-2.5 Si alloys tested after a 1100°C anneal for 30 minutes.

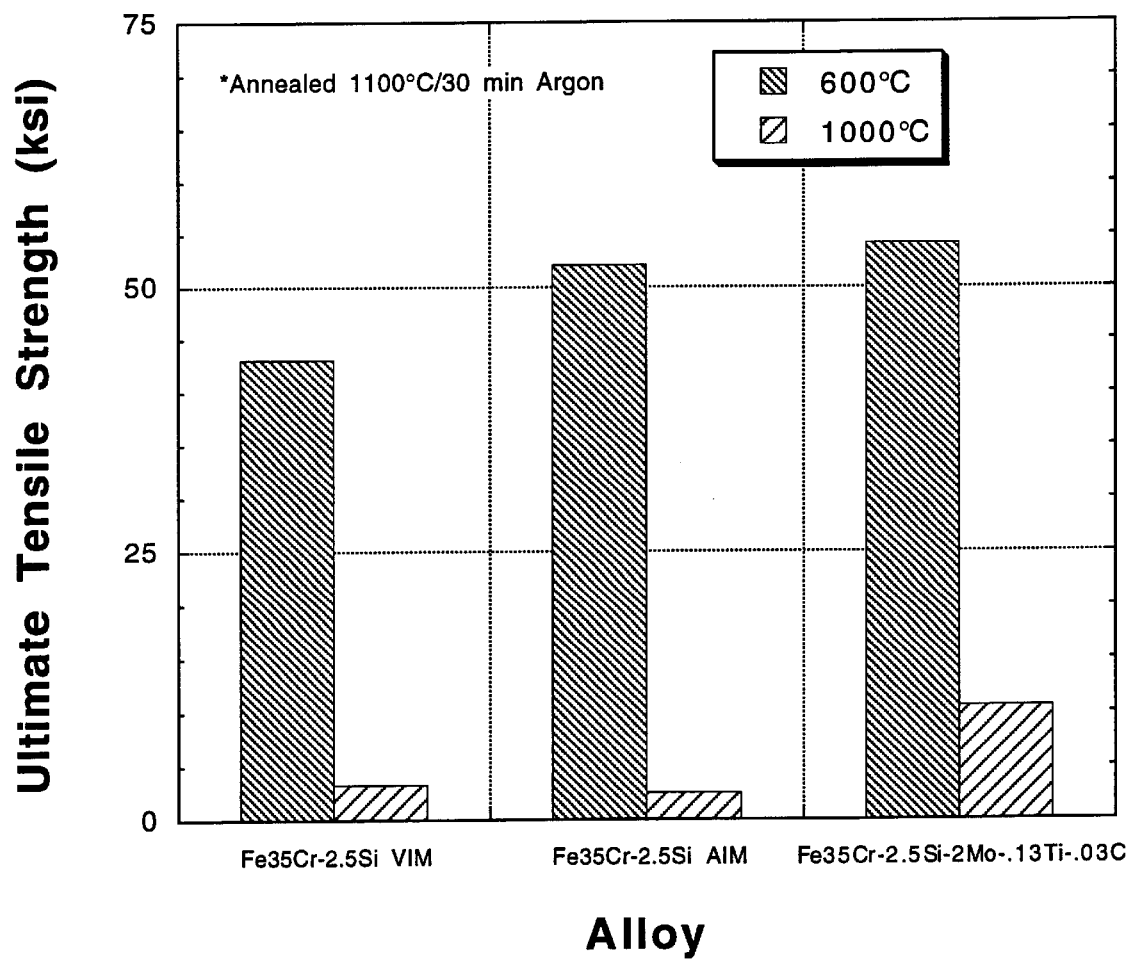
Fig. 32. Comparison of ultimate tensile strength at 600 and 1000°C of three Fe-35 Cr-2.5 Si alloys tested after a 1100°C anneal for 30 minutes.

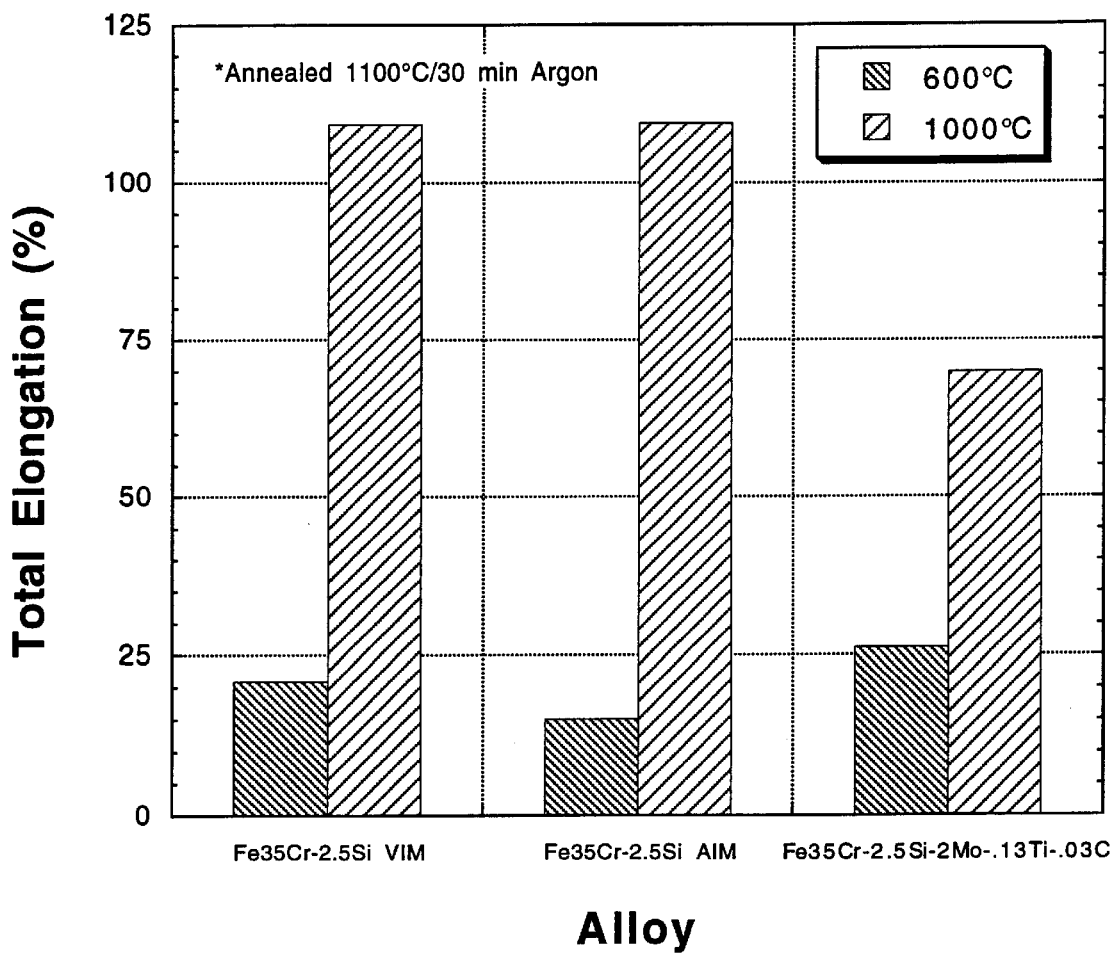
Fig. 33. Comparison of total elongation at 600 and 1000°C of three Fe-35 Cr-2.5 Si alloys tested after a 1100°C anneal for 30 minutes.

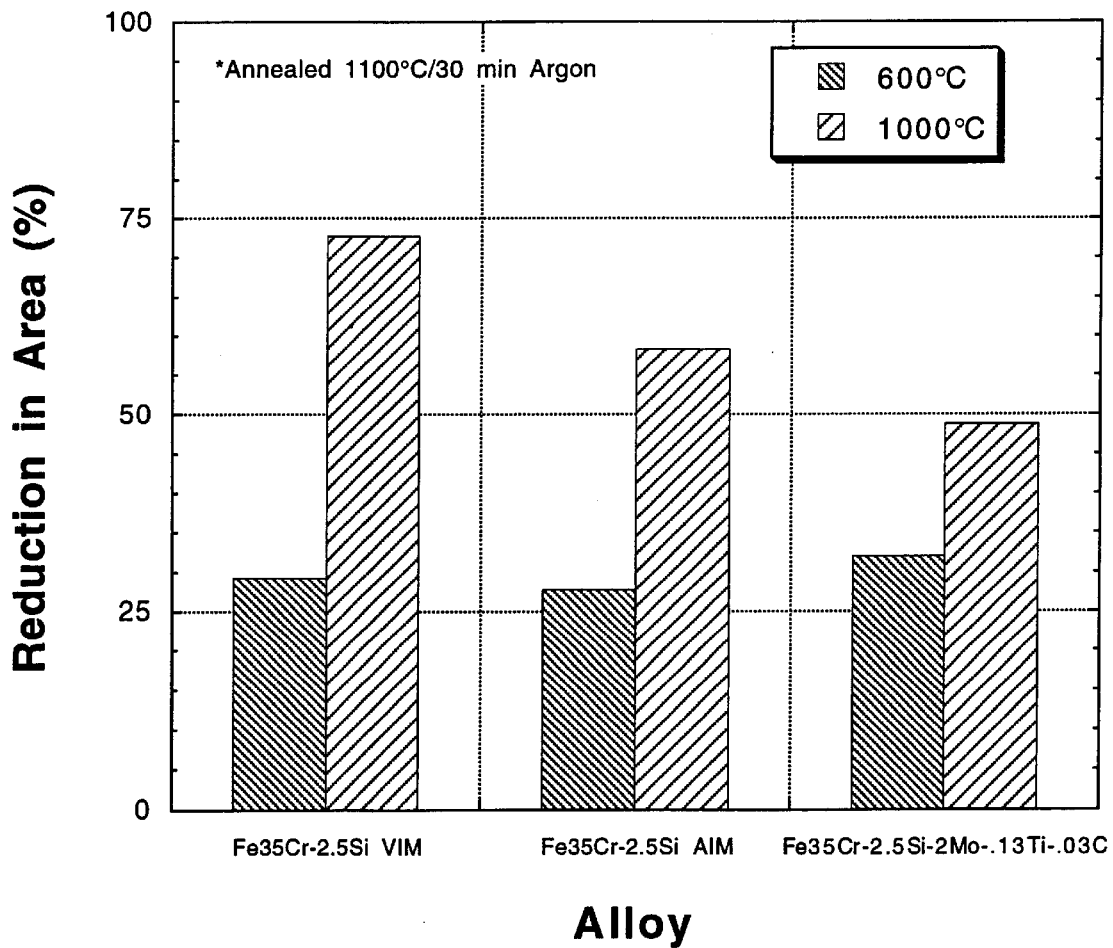
Fig. 34. Comparison of reduction of area at 600 and 1000°C of three Fe-35 Cr-2.5 Si alloys tested after a 1100°C anneal for 30 minutes.

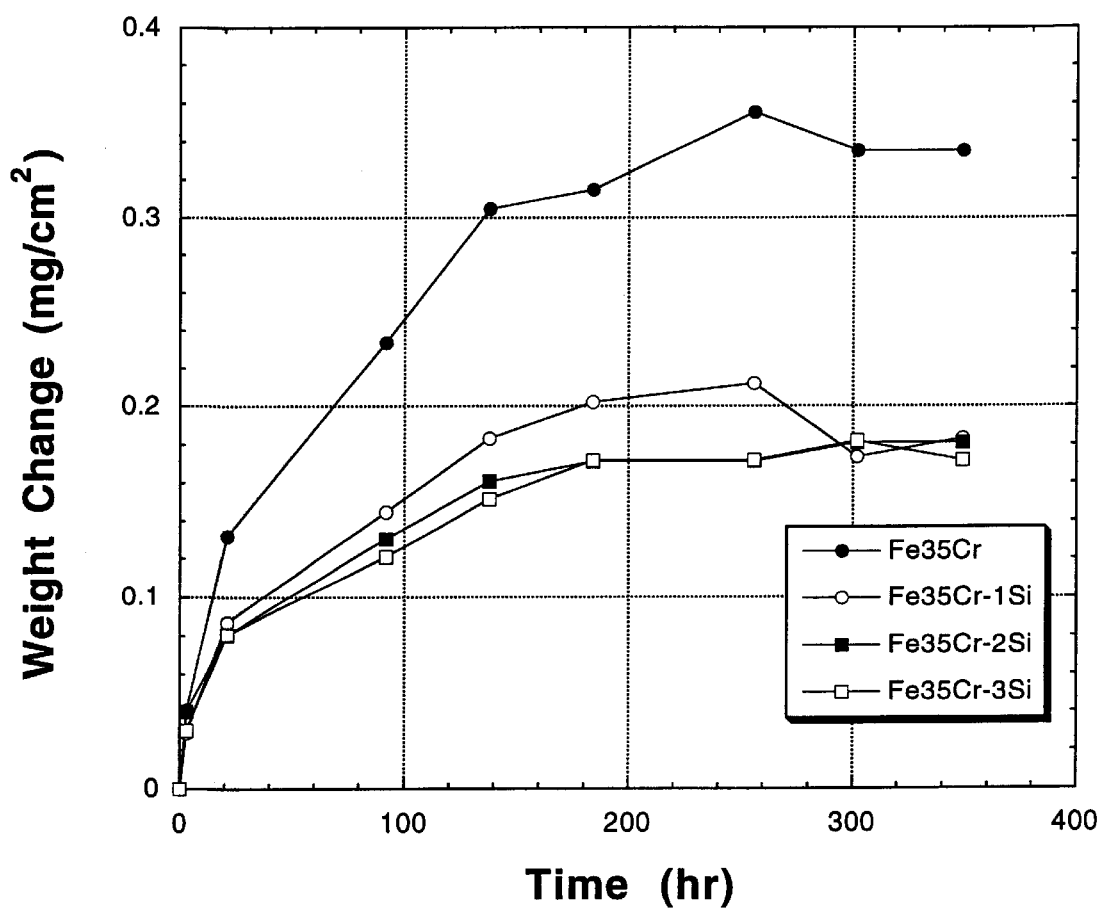
Fig. 35. Weight change as a function of time at 800°C during air oxidation for Fe-35 Cr alloys with 0 to 3% Si addition.

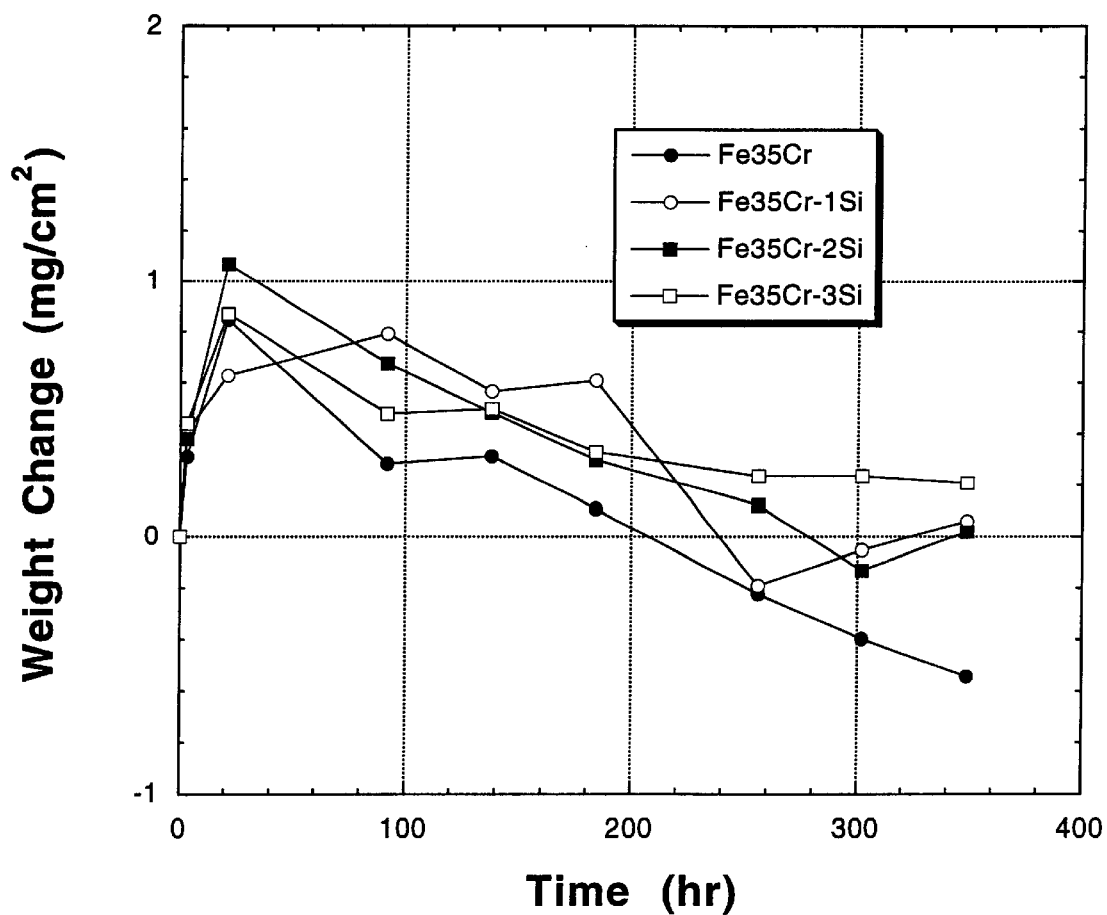
Fig. 36. Weight change as a function of time at 1000°C during air oxidation for Fe-35 Cr alloys with 0 to 3% Si addition.

IRON-CHROMIUM-SILICON ALLOYS FOR HIGH-TEMPERATURE OXIDATION RESISTANCE

The U.S. Government has rights in this invention pursuant to contract No. DE-AC05-96OR22464 between the Department of Energy and Lockheed Martin Energy Research Corporation.

BACKGROUND OF THE INVENTION

This invention relates generally to the art of alloys and more particularly to an iron chromium silicon alloy having oxidation and corrosion resistance.

Chromium is the most commonly used addition to iron for improving iron's corrosion resistance. It is also well known that there is a critical amount of chromium ($\geq 9\%$) that is needed to make the alloy resistant to rusting. The most preferred amount of chromium is 18% that is the basis of the most abundantly used 300 Series of stainless if steels. The phase diagram in FIG. 1 shows several interesting aspects, a including: (a) iron and chromium are completely soluble in each other Hz over the entire range; and (b) over the major compositional range, the iron and chromium alloys form the body-centered-cubic (BCC) α-phase. However, there are a few exceptions to the simple behavior, including: (i) in the chromium level of 13%, the α phase at room temperature undergoes a crystal structure change from the BCC cc to face-centered-cubic (FCC) γ in the temperature range of 831 to 1394° C. The FCC γ range can be stabilized to room temperature by increasing the chromium level to 18% and the nickel level to 8%. By converting the alloys to FCC over the entire temperature range, this provides at least three major benefits: (a) the FCC structure has higher strength up to high temperature of 1000° C.; (b) such crystal structure is easy to fabricate at room and high temperatures; and (c) the FCC structure is free from the brittle to ductile transition ($\leq$room temperature to >room temperature, respectively), which is a major issue with the BCC structure.

From the phase diagram in FIG. 1, it is also clear that the BCC α-phase is stable over the entire chromium content from $\geq 13$ to 100% at temperatures exceeding 821° C. However, at lower temperatures (function of chromium content), the BCC α-phase decomposes into a more complex σ-phase. Thus, the iron-chromium alloys with chromium exceeding 8% show an α-+σ-phase at room temperature. The presence of α-phase alone makes the alloy show: (a) lower strength that drops off rapidly at temperatures of $\geq 600°$ C., and (b) the structure undergoes the brittle-to-ductile transition. The presence of σ-phase makes the alloy more brittle.

Similar to chromium, silicon addition to iron also improves its oxidation resistance. The phase diagram of iron and silicon in FIG. 2 shows that at least up to 7% Si, the effect of silicon addition to iron is similar to that of the chromium addition to iron. The similarity is in stabilizing the FCC γ-phase from 912 to 1394° C. for a silicon content of 1.9%. Furthermore, the silicon addition up to approximately 7% stabilizes the BCC α-phase.

A combined look at the iron-chromium and iron-silicon phase diagrams indicates that the small additions of silicon (0 to 5%) to the iron-chromium system will only slightly alter its general crystal structural behavior.

From the above background, it is apparent that an Fe—Cr—Si alloy with good ii oxidation and corrosion resistance is desirable.

SUMMARY OF THE INVENTION

It is thus an object of this invention to provide an iron-chromium-silicon alloy with BCC α-phase.

It is a further object of this invention to provide such an alloy which has enhanced oxidation resistances at high temperatures.

It is yet a further object of this invention to provide such an alloy which has corrosion resistance at moderate temperatures.

These and as well as other objects are accomplished by a body centered cubic α-phase alloy formed from iron, chromium and silicon.

BRIEF DESCRIPTION OF THE DRAWINGS

FIGS. 1 and 2 are prior art phase diagrams of iron chromium and iron and silicon.

FIG. 3 charts the effect of chromium content and heat treatments of 900 and 1100° C. for 30 minutes on room-temperature yield strength of Fe—Cr alloys.

FIG. 4 charts the effect of chromium content and heat treatments of 900 and 1100° C. for 30 minutes on room-temperature ultimate tensile strength of Fe—Cr alloys.

FIG. 5 charts the effect of chromium content and heat treatments of 900 and 1100° C. for 30 minutes of room-temperature total elongation of Fe—Cr alloys.

FIG. 6 charts the effect of chromium content and heat treatments of 900 and 1100° C. for 30 minutes of room-temperature reduction of area of Fe—Cr alloys.

FIG. 7 charts the effect of annealing temperature on room-temperature yield strength of Fe—Cr alloys.

FIG. 8 charts the effect of annealing temperature on room-temperature ultimate strength of Fe—Cr alloys.

FIG. 9 chart the effect of annealing temperature on room-temperature total elongation of Fe—Cr alloys.

FIG. 10 charts the effect of annealing temperature on room-temperature reduction of area of Fe—Cr alloys.

FIG. 11 charts the effect of silicon content on room-temperature yield of Fe—Cr alloys. All of the data are for drop-cast heats. For Fe-35 Cr-2.5 Si, data are also included for a air-induction-melted 15-lb heat.

FIG. 12 charts the effect of silicon content on room-temperature ultimate tensile strength of Fe-35 Cr-2.5 Si, data are also included for a air-induction-melted 15-lb heat.

FIG. 13 charts the effect of silicon content on room-temperature total elongation of Fe-35 Cr—Si alloys. All of the data are for drop-cast heats. For Fe-35 Cr-2.5 Si, data are also included for a air-induction-melted 15-lb heat.

FIG. 14 charts the effect of silicon content on room-temperature reduction of area of Fe-35 Cr—Si alloys. All of the data are for drop-cast heats. For Fe-35 Cr-2.5 Si, data are also included for a air-induction-melted 15-lb heat.

FIG. 15 charts the effect of annealing temperature on room-temperature yield strength of air-induction-melted Fe-35 Cr-2.5 Si alloy.

FIG. 16 charts the effect of annealing temperature on room-temperature ultimate tensile strength of air-induction-melted Fe-35 Cr-2.5 Si alloy.

FIG. 17 charts the effect of annealing temperature on room-temperature total elongation of air-induction-melted Fe-35 Cr-2.5 Si alloy.

FIG. 18 charts the effect of annealing temperature on room-temperature reduction of area of air-induction-melted Fe-35 Cr-2.5 Si alloy.

FIG. 19 illustrates the optical microstructure of room-temperature tensile-tested specimen of air-induction melted Fe-35 Cr-2.5 Si alloy. The specimen was annealed at 900° C. for 30 minutes but showed a total elongation of 0.7%.

FIG. 20 illustrates the optical microstructure of room-temperature tensile-tested specimen of air-induction-melted Fe-35 Cr-2.5 Si alloy. The specimen was annealed at 900° C. for 30 minutes but showed a total elongation of 22.5%.

FIG. 21 illustrates the optical microstructure of room-temperature tensile-tested specimen of air-induction-melted Fe-35 Cr-2.5 Si alloy. The specimen of 0.7% elongation was annealed at 1200° C. for 30 minutes to determine if the o-phase would go into solution. This heat treatment eliminated the o-phase but was too high for a large grain growth.

FIG. 22 illustrates the effect of 1100° C. for 30-minute treatment on grain size of Fe-35 Cr—Si alloys: (a) coarsest grain size for the lowest nitrogen content, (b) finer grain size for the higher nitrogen content, (c) further grain refinement for titanium and carbon coating Fe-35 Cr-1.5 Si-2 Mo alloy, and (d) fine grain size banded structure for Fe-35 Cr2.5 Si-2 Mo-0.03 C-0.13 Ti alloy.

FIG. 23 is a photomicrograph showing detailed microstructure of vacuum-induction-melted Fe-35 Cr-2.5 Si alloy with very low nitrogen content.

FIG. 24 is a photomicrograph showing detailed microstructure of air-induction-melted Fe-35 Cr-2.5 Si alloy with high nitrogen content.

FIG. 25 is a photomicrograph showing detailed microstructure of drop-cast Fe-35 Cr-2.5 Si-2 Mo-0.03 C-0.13 Ti alloy.

FIG. 26 is a photomicrograph showing detailed microstructure of drop-cast Fe-35 Cr-2.5 Si-2 Mo-0.03 C-0.13 C-0.13 Ti alloy.

FIG. 27 charts the yield strength at 600° C. as a function of silicon content for Fe-35 Cr—Si alloys. All of the specimens were tested after a 900° C. anneal for 30 minutes.

FIG. 28 charts the ultimate tensile strength at 600° C. as a function of silicon content for Fe-35 Cr—Si alloys. All of the specimens were tested after a 900° C. anneal for 30 minutes.

FIG. 29 charts the total elongation at 600° C. as a function of silicon content for Fe-35 Cr—Si alloys. All of the specimens were tested after a 900° C. anneal for 30 minutes.

FIG. 30 charts the reduction of area at 600° C. as a function of silicon content for Fe-35 Cr—Si alloys. All of the specimens were tested after a 900° C. anneal for 30 minutes.

FIG. 31 is a comparison of yield strength at 600 and 1100° C. of three Fe-35 Cr-2.5 Si alloys tested after a 1100° C. anneal for 30 minutes.

FIG. 32 is a comparison of ultimate tensile strength at 600 and 1000° C. of three Fe-35 Cr-2.5 Si alloys tested after a 1100° C. anneal for 30 minutes.

A. FIG. 33 is a comparison of total elongation at 600 and 1000° C. of three Fe-35 Cr-2.5 Si alloys tested after a 1100° C. anneal for 30 minutes.

FIG. 34 is a comparison of reduction of area at 600 and 1000° C. of three Fe-35 Cr-2.5 Si alloys tested after a 1100° C. anneal for 30 minutes.

FIG. 35 charts the weight change as a function of time at 800° C. during air oxidation for Fe-35 Cr alloys with 0 to 3% Si addition.

FIG. 36 charts the weight change as a function of time at 1000° C. during air oxidation for Fe-35 Cr alloys with 0 to 3% Si addition.

DETAILED DESCRIPTION

This invention is based on an iron-chromium-silicon system with a unique combination of very high-temperature oxidation resistance in air, resistance in molten glass, and resistance in certain corrosive environments at low temperatures. This invention is directed to the iron-chromium system over a chromium range of 35 to 50% with silicon additions of up to 3% and minor additions of other elements. A preferred composition of 35 Fe-2.5 Si alloys with and without additions of other minor elements result in other advantages.

For further understanding of the invention the following specific examples are given:

EXAMPLE I

This example involves the production of Fe—Cr, Fe—Cr—Si, Fe—Cr—Si—Mo, and Fe—Cr—Si—Mo—Ti—C compositions. Detailed compositions of the alloys are given in Table 1. All of the compositions were produced as 1-lb heats using a nonconsumable-arc-melting process. The pure elements for each of the elements in the alloy were arc melted in a water-cooled copper crucible. Prior to melting, the furnace chamber was pumped down to a vacuum of $10^{-5}$ to $10^{-6}$ torr and backfilled with a low pressure of high-purity argon. In order to produce a homogeneous composition, the alloys were melted six times in the water-cooled copper crucible into a button. The button was transferred to another water-cooled copper crucible with a hole, and the molten metal was drop-cast into a water-cooled copper mold. The castings from this mold consisted of 0.50×1×5 in. dimensions.

Each of the castings was hot rolled at 1100° C. from 0.50 to 0.100 in. and subsequently cold-rolled to 0.030-in. thickness for mechanical properties testing. The sheets of 0.100-in. thickness were used for corrosion testing.

EXAMPLE II

Nonconsumable-arc-melting process was used to cast 6 (see Table 2) of the 12 alloys (listed in Table 1) into 1-in.-diam by 5-in.-long ingots. All of the ingots were homogenized at 1100° C. for 1 h in vacuum (~$1\times10^{-5}$ torr) and cold swaged 56% in cross-sectional area reduction to a final diameter of 0.5 in. The length of the cast ingots increased from 5 to 18 in. during the cold swaging process.

The composition with carbon plus titanium addition for grain refinement could not be cold swaged without cracks after either of the two homogenization treatments (1100° C. for 1 h or 1150° C. for 1.5 h). It is believed that the carbon plus titanium, which is added for grain refinement, triggers the precipitation of σ-phase, which is not put into solution by the heat treatments used, and causes the low ductility condition at room temperature. The processing of this alloy will benefit from either: (1) a higher homogenization treatment or (2) hot processing at temperatures exceeding 900° C.

EXAMPLE III

Over six heats of 18-lb size were air-induction melted (AIM) and cast into 1-in.×6-in.×10-in. slabs. The slabs were hot rolled at 1100° C. to 0.25 in. thickness followed by warm rolling at 400° C. to a finish thickness of 0.140 in. These sheets were used for bending and welding studies. A small section of the sheet from one of the heats was also cold rolled to 0.030-in. thickness for mechanical properties testing. A detailed chemical analysis of the three AIM heats are given in Table 3 which shows that the AIM of the Fe—Cr—Si alloys results in pickup of nitrogen. The primary effect of the nitrogen pickup is the precipitation of chromium nitride precipitates, which can serve as the nucleation sites for the σ-phase formation. Thus, air melting will require higher homogenization temperatures for dissolution of σ-phase for low-temperature processing or higher processing temperatures where σ-phase is not detrimental to ductility.

An alternate to reducing the nitrogen content in the AIM heats is to melt them by vacuum induction melting (VIM).

EXAMPLE IV

One 15-lb-size heat of Fe-35 Cr-2.5 Si was processed by VIM. The purpose of this heat was to determine the effect of melting practice (AIM versus VIM) on the levels of nitrogen and oxygen content of the alloy. A comparison of chemical analysis of the VIM heat with the three AIM heats is shown in Table 3. This comparison shows that VIM completely eliminates the pickup of nitrogen and oxygen as opposed to AIM.

The VIM heat was cast into a 1⅛×4×4-in. slab. After cutting the hot top, the slab was homogenized at 1100° C. for 2 h. Following homogenizing, the slab was hot-rolled at 1100° C. from 1.125 in. to 0.5-in. thickness. Each rolling pass was 10% with reheats of 10 min between the passes. From 0.5 to 0.25 in., the rolling was carried out at 510° C. Each rolling pass was 10% with reheats of 10 min between passes. A part of the 0.25-in. plate was given an annealing treatment at 900° C. for 0.5 h in air. Following the annealing treatment, the 0.25-in.-thick sheet was cold-rolled to 0.030-in. thickness without any additional annealing treatments. The cold-rolling response was so good that the 0.030-in.-thick sheet could be further cold-rolled down to 0.005- and 0.0031-in.-thick foils without any anneals.

Based on the results of this study, it is anticipated that hot rolling at 1100° C. could have been done with reduction per pass of 20% as opposed to 10% given in this experiment.

TABLE 1

5. DETAILED DESCRIPTION OF THE INVENTION: (Continued)
Table 1. Compositions of Fe—Cr alloys[a]

| Heat number | Element (wt %) | | | | | |
|---|---|---|---|---|---|---|
| | Fe | Cr | Si | Mo | Ti | C |
| 1 16861 | 65 | 35 | — | — | — | — |
| 2 16900 | 60 | 40 | — | — | — | — |
| 3 16901 | 55 | 45 | — | — | — | — |
| 4 16902 | 50 | 50 | — | — | — | — |
| 5 16862 | 64 | 35 | 1 | — | — | — |
| 6 16863 | 63 | 35 | 2 | — | — | — |
| 7 16893 | 62.5 | 35 | 2.5 | — | — | — |
| 8 16864 | 62 | 35 | 3.0 | — | — | — |
| 9 16894 | 60.0 | 35 | 2.5 | 2 | — | — |
| 10 16895 | 60.47 | 35 | 2.5 | 2 | — | 0.03 |
| 11 16896 | 60.34 | 35 | 2.5 | 2 | 0.13 | 0.03 |
| 12 16897 | 61.34 | 35 | 1.5 | 2 | 0.13 | 0.03 |

[a]Typically, 1-lb heats arc melted and cast into 0.5 × 1 × 5-in. ingots.

TABLE 2

5. DETAILED DESCRIPTION OF THE INVENTION (Continued)
Table 2. Compositions of selected Fe—Cr—Si alloys

| Heat number | Element (wt %) | | | | |
|---|---|---|---|---|---|
| | Fe | Cr | Si | Ti | C |
| 1 17043 | 65 | 35 | — | — | — |
| 2 17044 | 64 | 35 | 1 | — | — |
| 3 17045 | 63 | 35 | 2 | — | — |
| 4 17047 | 62.5 | 35 | 2.5 | — | — |
| 5 17046 | 62 | 35 | 3 | — | — |
| 6 17048 | 62.34 | 35 | 2.5 | 0.13 | 0.03 |

[a]Typically 1-lb heats arc melted and cast into 1-in.-diam by 5-in.-long ingots.

TABLE 3

5. DETAILED DESCRIPTION OF THE INVENTION: (Continued)
Table 3. Compositions of air- and vacuum-induction-melted Fe—35Cr—2.5Si heats

| | | Weight percent | | | |
|---|---|---|---|---|---|
| Element | Nominal | Sheet[a] 1 | Sheet[a] 2 | Sheet[a] 3 | Heat[b] 17076 |
| C | — | 0.023 | 0.011 | 0.012 | 0.007 |
| Mn | — | 0.04 | 0.04 | 0.04 | 0.04 |
| P | — | 0.004 | 0.004 | 0.003 | 0.004 |
| S | — | 0.002 | 0.002 | 0.002 | 0.004 |
| Si | 2.5 | 2.32 | 2.55 | 2.44 | 2.53 |
| Ni | — | <0.01 | <0.01 | <0.01 | 0.01 |
| Cr | 35 | 35.0 | 35.0 | 35.1 | 34.86 |
| Mo | — | <0.01 | <0.01 | <0.01 | <0.01 |
| V | — | <0.01 | <0.01 | <0.01 | <0.01 |
| Cb | — | <0.01 | <0.01 | <0.01 | <0.01 |
| Cu | — | 0.07 | 0.01 | 0.01 | 0.01 |
| Fe | c | c | c | c | c |
| N | — | 0.052 | 0.035 | 0.044 | <0.001 |
| O | — | 0.027 | 0.028 | 0.030 | 0.001 |

[a]Typically, 18-lb heats air-induction melted and cast into 1 × 6 × 10-in. slabs.
[b]A 15-lb heat, vacuum-induction melted and cast into a 1⅛ × 4 × 4-in. slab.
[c]Balance.

The following tests and observations were made with regard to the above samples.

Tensile Properties

The 30-mil-thick sheets produced from the 1-lb size arc-melted heats were punched into 0.5-in.-gauge length specimens for tensile testing. After punching, all of the specimens were initially given a standard heat treatment of 900° C. for 30 min in either argon or argon-4% hydrogen. Tensile data for this standard heat treatment are summarized in Table 4.

Chromium Effect

Tensile properties of the Fe—Cr alloys after the standard heat treatment are plotted as a function of chromium content in FIGS. 3 through 6. These figures show that the addition of chromium to iron in the range of 35 to 50% increases its: (1) 0.2 yield strength (nearly doubles it), (2) ultimate tensile strength (by 50%), and (3) only very slightly decreases the total elongation and reduction of area.

Effect of Heat Treatment on Fe—Cr Alloys

Sheet specimens of the Fe-40 Cr. Fe-45 Cr. and Fe-50 Cr were subjected to a 30-min treatment in argon at temperatures of 800, 900, 1000, and 1100° C. The effect of an annealing treatment on room-temperature tensile properties of the Fe—Cr alloys are summarized in Table 5 and plotted in FIGS. 7 through 10. These figures show that varying the annealing temperature from 800 to 1100° C. has only a small effect on room-temperature tensile properties. The most significant effect is the reduction of yield strength of the Fe-50 Cr alloy in going from 800 to 1100° C. It is believed that increase in grain size especially at 1000 and 1100° C. is the main source for the decrease in yield strength after annealing at these two higher temperatures.

Effect of Silicon Variation on Tensile Properties of Fe-35 Cr—Si Alloys at Room Temperature Based on the results of chromium variation in Fe—Cr alloys, Fe-35 Cr was chosen as the base for the addition of other alloying elements. Criteria for selecting Fe-35 Cr alloys included: (1) only a minimum additional improvement in oxidation properties by going from 35 to 50% Cr. and (2) lower cost of Fe-35 Cr as opposed to higher chromium levels. As shown in Table 1, the silicon additions to Fe-35 Cr were varied systematically from 1 to 3%. The effect of silicon addition to the tensile properties of Fe-35 Cr—Si alloys of arc-melted small heats at room temperature is included in Table 4. These data are plotted in FIGS. 11 through 14 and show the following effects of silicon addition to Fe-35 Cr alloys:

1. The 0.2% yield strength increases with increasing silicon content. Note the increase from 53 ksi for Fe-35 Cr to 74 ksi for the Fe-35 Cr-3 Si alloy.
2. Ultimate tensile strength also increases with the increase in silicon content from 0 to 3%. The value increased from 72 to 90 ksi in going from Fe-35 Cr to Fe-35 Cr-3 Si alloy. This increase in ultimate tensile strength is comparable to that observed for the yield strength.
3. Ductility (total elongation and reduction of area) values decreased with the increase in silicon content from 0 to 3%. The total elongation values dropped from 29 to 3% with the addition of 3% Si to the Fe-35 Cr alloy. Similar drops were observed in the reduction of area values.

TABLE 4

Tensile properties of Fe—Cr—Si alloys[a] at room temperature (900° C./30 min anneal)

| | | Strength (ksi) | | Ductility (%) | |
|---|---|---|---|---|---|
| Alloy | Alloying element | 0.2% Yield | Ultimate | Total elongation | Reduction of area |
| 1 | Fe—35 Cr | 53.27 | 72.13 | 29.10 | 33.44 |
| 2 | Fe—40 Cr | 71.35 | 83.19 | 26.44 | 36.93 |
| 3 | Fe—45 Cr | 86.23 | 94.52 | 23.88 | 31.92 |
| 4 | Fe—50 Cr | 108.28 | 110.75 | 23.44 | 34.50 |
| 5 | Fe—35 Cr—1 Si | 57.05 | 74.84 | 26.88 | 37.58 |
| 6 | Fe—35 Cr—2 Si | 62.96 | 85.06 | 23.04 | 36.67 |
| 7 | Fe—35 Cr—2.5 Si | 74.80 | 82.28 | 2.24 | 2.20 |
| | | 74.25 | 83.53 | 3.12 | 4.12 |
| 8 | Fe—35 Cr—3.0 Si | 73.07 | 89.87 | 3.70 | 3.54 |
| | | 79.80 | 87.59 | 2.20 | 1.34 |
| 9 | Fe—35 Cr—2.5 Si—2 Mo | 34.77 | 34.77 | 0.06 | 1.73 |
| | | 25.65 | 25.65 | 0 | 0.74 |
| 10 | Fe—35 Cr—1.5 Si—2 | 78.33 | 82.18 | 1.20 | 1.45 |

TABLE 4-continued

Tensile properties of Fe—Cr—Si alloys[a] at room temperature (900° C./30 min anneal)

| | | Strength (ksi) | | Ductility (%) | |
|---|---|---|---|---|---|
| Alloy | Alloying element | 0.2% Yield | Ultimate | Total elongation | Reduction of area |
| | Mo—0.03 C—0.13 Ti | 76.27 | 97.48 | 11.84 | 8.32 |
| | | 80.32 | 83.35 | 1.00 | 1.37 |

[a]Typically 1-lb heats cast into 0.5 × 1 × 5-in. ingots. All of the specimens tested were punched from 30-mil-thick sheet with a common heat treatment of 900° C. for 30 min in argon-4% hydrogen or an argon environment.

TABLE 5

Effect of heat treatment on tensile properties of Fe—Cr alloys[a] at room temperature

| Heat treatment | | Strength (ksi) | | Ductility (%) | |
|---|---|---|---|---|---|
| Temperature (° C.) | Time (min) | 0.2% Yield | Ultimate | Total elongation | Reduction of area |
| Fe—35 Cr | | | | | |
| 900 | 30 | 53.27 | 72.13 | 29.10 | 33.44 |
| Fe—40 Cr | | | | | |
| 800 | 30 | 71.89 | 83.36 | 27.40 | 38.46 |
| 900 | 30 | 71.35 | 83.19 | 26.44 | 36.93 |
| 1000 | 30 | 66.72 | 82.41 | 27.46 | 25.35 |
| 1100 | 30 | 65.92 | 83.45 | 22.54 | 32.86 |
| Fe—45 Cr | | | | | |
| 800 | 30 | 89.92 | 96.77 | 24.66 | 34.00 |
| 900 | 30 | 86.23 | 94.52 | 23.88 | 31.92 |
| 1000 | 30 | 83.48 | 93.74 | 26.28 | 34.33 |
| 1100 | 30 | 80.28 | 95.40 | 22.76 | 26.78 |
| Fe—50 Cr | | | | | |
| 800 | 30 | 113.51 | 113.51 | 22.80 | 30.97 |
| 900 | 30 | 108.28 | 110.75 | 23.44 | 34.50 |
| 1000 | 30 | 99.26 | 108.41 | 22.86 | 30.84 |
| 1100 | 30 | 89.66 | 108.87 | 21.36 | 27.24 |

[a]All of the specimens tested were punched from 30-mil-thick sheet.

Tensile Properties of Fe-35 Cr-2.5 Si Alloys

Tensile properties of small arc-melted heats of Fe-35 Cr-2.5 Si presented in Table 4 show that while its yield and ultimate tensile strength are similar between 2 and 3 Si alloy (see FIGS. 11 and 12), its ductility values are significantly lower than expected. In order to explore the reasons for low ductility values, several specimens from the sheet produced from the large heats (18-lb size) were systematically annealed from a temperature of 500 to 1100° C. for 30 min. All of the anneals except for two samples were run in an argon gas environment. Two samples were annealed at 900° C. in a argon-4% hydrogen environment to determine any possible embrittlement effects of hydrogen in the gas. Tensile data on these specimens are summarized in Table 6 and plotted as a function of annealing temperature in FIGS. 15 through 18. These data show the following:

1. Annealing treatment at 500° C. results in very high values of yield and ultimate tensile strength. These values are over double of those in the fully annealed condition (900° C./30 min). This implies that cold working can significantly enhance the strength values of the Fe-35 Cr-2.5 Si alloy. The elongation and reduction of area values are reasonable.

2. An annealing treatment at 600° C. appears to anneal out some of the cold work as reflected by the drop in yield strength from 170 to 141 ksi, but ductility values are unaffected.
3. Annealing temperatures of 700 and 800° C. further lower the yield strength, but ductility values are also reduced to essentially <1%. These low values are believed to result from the formation of brittle σ-phase.

TABLE 6

Effect of annealing treatment on room-temperature properties of highly cold-rolled sheet of Fe—35 Cr—2.5 Si alloy (air melted, high nitrogen content)

| Treatment | | | Strength (ksi) | | Ductility (%) | |
|---|---|---|---|---|---|---|
| Temperature (° C.) | Time (min) | Environment | 0.2% Yield | Ultimate | Total elongation | Reduction of area |
| 500 | 30 | Argon | 170.89 | 177.07 | 7.32 | 16.28 |
| 600 | 30 | Argon | 141.49 | 151.43 | 7.80 | 14.19 |
| 700 | 30 | Argon | 100.56 | 100.56 | 0.80 | 1.76 |
| 800 | 30 | Argon | 77.37 | 77.37 | 0.50 | 0.73 |
| 900 | 30 | Argon | 74.11 | 90.09 | 23.70 | 31.76 |
| 900 | 30 | Argon | 72.41 | 90.10 | 24.56 | 37.44 |
| 900 | 30 | Argon-4% $H_2$ | 76.84 | 76.84 | 0.70 | 1.44 |
| 900 | 30 | Argon-4% $H_2$ | 77.56 | 94.74 | 22.50 | 34.32 |
| 1000 | 30 | Argon | 71.03 | 86.59 | 21.08 | 24.73 |
| 1100 | 30 | Argon | 73.43 | 85.95 | 15.06 | 19.06 |

The kinetics of σ-phase formation are most likely the highest at 700 and 800° C., because these temperatures are closest to the σ-α phase transformation boundary (FIG. 1). The drop in yield strength is most likely the direct result of annealing out a substantial portion of the cold work, which is the same as removal of dislocations.

4. Duplicate specimens annealed at 900° C. for 30 min in argon resulted in total elongation values of nearly 24%, which is significantly higher than 2.5% observed in the arc-melted material (Table 4). The next set of two specimens was annealed at 900° C. for 30 min in argon-4% hydrogen gas. Data on these specimens in Table 6 show that one specimen has no ductility, while the other had 22.50%. Metallographic examination of specimens with 0.7 and 22.5% elongation are compared in FIGS. 19 and 20. These micrographs show that the low-ductility specimen has a large fraction of the second phase at the grain boundaries, whereas the high-ductility specimen is free from the second phase. The phase diagram in FIG. 1 shows that the Fe—Cr alloys in the range of this investigation is prone to σ-phase formation. It is believed that the alloying element segregation resulted in σ-phase, with a composition that did not go into solution at 900° C. However, if the σ-phase is absent to either start with or by the 900° C. treatment, ductility values of 20 to 25% are observed. This is true for three of the four specimens tested after an anneal at 900° C. Since similar ductility values are reached in argon or argon-4% hydrogen environment treated samples, hydrogen is not considered to cause any detrimental effect.

The low-ductility specimen containing σ-phase was subjected to a 1200° C./30 min treatment to check if the σ-phase could be put into solution. Metallography presented in FIG. 21 shows that such a treatment completely dissolves all of the σ-phase. The only side effect of such a treatment is the large grain growth. These results have provided a clear guidance that if chemical segregation is eliminated during processing and a heat treatment, the high room-temperature ductility values are achievable in Fe-35 Cr-2.5 Si alloys. This is demonstrated by high-ductility values of specimens annealed at 1000 and 1100° C. (Table 6).

Effect of 1100° C./30 Min Treatment on Room-Temperature Tensile Properties of Fe-35 Cr—Si Alloys Several of the Fe—Cr—Si alloys were retested with an annealing treatment of 1100° C. for 30 min. Room-temperature tensile data for specimens annealed at 1100° C. for 30 min are compared in Table 7 with those tested after an annealing treatment at 900° C. for 30 min. The following observations are possible from this table:

1. A treatment at 1100° C. for 30 min improved the ductility of the alloys where it showed either low value or a lot of scatter with 900° C. for 30 min. This is especially true for the Fe-35 Cr-3 Si alloy where values of 2 to 4% increased to 22% after a 1100° C. treatment. Similarly, Fe-3 5 Cr-1.5 Si-2 Mo-0.03 C-0.13 Ti with large scatter in the data from 1 to 12% increased to 25%. The 1100° C./30 min treatment also provided a reasonable ductility of approximately 5% for a more complex Fe-35 Cr-2.5 Si-2 Mo-0.03 C-0.13 Ti alloy.

TABLE 7

Effect of 900 and 1100° C. treatment on tensile properties of Fe—35 Cr—Si alloys[a] at room temperature

| Heat treatment | | Strength (ksi) | | Ductility (%) | |
|---|---|---|---|---|---|
| Temperature (° C.) | Time (min) | 0.2% Yield | Ultimate | Total elongation | Reduction of area |
| Fe—35 Cr—1 Si | | | | | |
| 900 | 30 | 57.05 | 74.84 | 26.88 | 37.58 |
| 1100 | 30 | 61.70 | 81.20 | 26.58 | 35.21 |
| Fe—35 Cr—2 Si | | | | | |
| 900 | 30 | 62.96 | 85.06 | 23.04 | 36.67 |
| 1100 | 30 | 67.47 | 86.51 | 18.70 | 21.78 |
| Fe—35 Cr—2.5 Si | | | | | |
| 900 | 30 | 74.11 | 90.09 | 23.70 | 31.76 |
| 900 | 30 | 72.41 | 90.10 | 24.56 | 37.44 |
| 900 | 30[b,c] | 76.84 | 76.84 | 0.70 | 1.44 |
| 900 | 30[b] | 77.56 | 94.4 | 22.50 | 34.32 |
| 1100 | 30 | 73.43 | 85.95 | 15.06 | 19.06 |

TABLE 7-continued

Effect of 900 and 1100° C. treatment on tensile properties of Fe—35 Cr—Si alloys[a] at room temperature

| Heat treatment | | Strength (ksi) | | Ductility (%) | |
|---|---|---|---|---|---|
| Temperature (° C.) | Time (min) | 0.2% Yield | Ultimate | Total elongation | Reduction of area |
| Fe—35 Cr—3 Si | | | | | |
| 900 | 30 | 73.07 | 89.87 | 3.70 | 3.54 |
| 900 | 30 | 79.80 | 87.59 | 2.20 | 1.34 |
| 1100 | 30 | 74.11 | 94.18 | 21.96 | 22.71 |
| Fe—35 Cr—1.5 Si—2 Mo—0.03 C—0.13 Ti | | | | | |
| 900 | 30 | 78.33 | 82.18 | 1.20 | 1.45 |
| 900 | 30 | 76.27 | 97.48 | 11.84 | 8.32 |
| 900 | 30 | 80.32 | 83.35 | 1.00 | 1.37 |
| 1100 | 30 | 73.33 | 95.59 | 24.60 | 32.93 |
| Fe—35 Cr—2.5 Si—2 Mo—0.03 C—0.13 Ti | | | | | |
| 1100 | 30 | 85.60 | 100.77 | 4.96 | 4.20 |

[a]All of the tested specimens were punched from 30-mil-thick sheet.
[b]Specimens annealed in argon-4% hydrogen. All others were annealed in argon.
[c]Specimen showed the presence of σ-phase.

2. When ductility is high for 900° C./30-min treatment, its value dropped some for 1100° C./30 min. This is true for Fe-35 Cr-2 Si and Fe-35 Cr-2.5 Si. This drop in ductility is believed to arise from grain growth by the 1100° C./30-min treatment.

Optical microstructures of Fe-35 Cr—Si alloys of different compositions after 1100° C. for 30-min annealing treatment are shown in FIGS. 22 through 26. The micrographs in these figures show the following:

1. Low nitrogen content in VIM Fe-35 Cr-2.5 Si alloy results in its largest grain size.
2. Higher nitrogen content in AIM Fe-35 Cr-2 Si alloy results in grain refinement as opposed to low nitrogen heat.
3. The TiC in the Fe-35 Cr-1.5 Si-2 Mo-0.03 C-0.13 Ti results in significantly more grain refinement than even high nitrogen heat. This alloy also contains a continuous phase at the grain boundaries.
4. The Fe-35 Cr-2.5 Si-2 Mo-0.03 C-0.13 Ti heat results in a banded fine i grain structure.

The grain refinement in the base Fe-35 Cr-2.5 Si alloy and more complex Fe-35 Cr—Si—Mo—C—Ti alloys shows interesting effects on properties described here and to be discussed in the next section. The a-phase free and more homogeneous microstructure by 1100° C. for 30 min are considered responsible for consistently producing higher ductility in both simple and complex alloys.

Effect of Melting Practice on Room-Temperature Tensile Properties of Fe-35 Cr-2.5 Si Composition As shown in Table 3, the VIM composition of Fe-35 Cr-2.5 Si was free of nitrogen as opposed to significant nitrogen pickup in the AIM composition. Tensile properties of the same alloy with low nitrogen (VIM) and high nitrogen (AIM) are compared in Table 8. The following observations are possible from this table:

1. For the same heat treatment, both low and high nitrogen compositions have comparable yield and ultimate tensile strengths.
2. For the same heat treatment, the low nitrogen composition has lower ductility than the high nitrogen heat. This is attributed to the fact that lower nitrogen content alloy has no grain boundary pinning points and thus can develop larger grain size as opposed to the high nitrogen heat (compare FIGS. 22(a) and 22(b) for grain size after 1100° C. treatment for the two heats).

Given the choice between AIM and VIM, the VIM may be preferred, especially for components where second phase particles (nitrides) may not be desirable. It is well known that second phase particles such as nitrides can cause poor surface finish for very thin sections or act as crack initiators under fatigue conditions.

EXAMPLE V

In addition to hot and cold rolling of slabs to sheet fabrication of weld wire from the 15-lb ingot of Fe-35 Cr-2.5 Si alloy was also attempted. In this case, a 3-in.-diam by 7-in.-long ingot was hot extruded at 1100° C. through a ⅜-in. die, which is an area reduction of 64:1. The extruded rod of ⅜-in. diam had excellent quality. A 36-in.-long piece of the rod was annealed at 900° C. for 30 min and cold-swaged to 0.125 in.

TABLE 8

Effect of air (high nitrogen) versus vacuum (low nitrogen) on room temperature tensile properties of Fe—35 Cr—2.5 Si

| Heat treatment | | Strength (ksi) | | Ductility (%) | |
|---|---|---|---|---|---|
| Temperature (° C.) | Time (min) | 0.2% Yield | Ultimate | Total elongation | Reduction of area |
| Air Melted | | | | | |
| 900 | 30 | 74.11 | 90.09 | 23.70 | 31.76 |
| 900 | 30 | 72.41 | 90.10 | 24.56 | 37.44 |
| 900 | 30[a,b] | 76.84 | 76.84 | 0.70 | 1.44 |
| 900 | 30[a] | 77.56 | 94.74 | 22.50 | 34.32 |
| 1100 | 30 | 73.43 | 85.95 | 15.06 | 19.06 |
| Vacuum Melted | | | | | |
| c | c | 172.08 | 175.03 | 5.10 | 13.16 |
| 900 | 30 | 78.0 | 99.30 | 18.56 | 25.02 |
| 1100 | 30 | 73.38 | 81.62 | 15.70 | 20.55 |

[a]Annealed in argon-4% hydrogen.
[b]Contained σ-phase.
[c]As rolled.

without any intermediate temperature anneal. Reduction from ⅜ to 0.125 in. diam is an area reduction of 89%. After another anneal of 0.125-in.-diam wire at 900° C. for 30 min, the wire could be drawn to 0.035 in. diam, which is typical of the weld wire size required for high-production-rate MIG welding process. This case has demonstrated that the Fe-35 Cr-2.5 Si alloy can be processed by conventional hot- and cold-working processes into wire for welding and other potential applications.

Tensile Properties of Fe—Cr—Si Alloys at High Temperature

High-temperature tensile tests were conducted on Fe-35 Cr alloys with 1 to 3% Si content and, in some cases, with other alloying elements. Tensile tests were conducted at 600 and 1000° C. The specimens tested were annealed at 900° C. for 30 min and at 1100° C. for 30 min. Tensile data on various specimens are summarized in Table 9. Tensile data at 600° C. for samples tested after treatment at 900° C. for 30 min are plotted as a function of silicon content in FIGS. 27 through 30. These figures show the following:

1. Increasing the silicon content of Fe-35 Cr—Si alloys from 0 to 3 wt % increases its yield strength at 600° C.

from 26 to 41 ksi. Similar increases are observed in the ultimate tensile strength.

2. Increase in yield and ultimate tensile strengths with increasing silicon content results in a corresponding decrease in ductility. However, the ductility values at 600° C. are so high that a small decrease is of no significant consequence.

strength properties are inversely related to grain size. The absence of any chromium nitrides in low nitrogen heat results in coarser grain size and, thus, higher yield strength value.

The Fe-35 Cr-2.5 Si-2 Mo-0.13 Ti-0.03 C alloy showed significantly higher yield strength than low and high nitrogen containing Fe-35 Cr-2.5

TABLE 9

Tensile properties at 600 and 1000° C. of Fe—Cr—Si alloys

| Heat treatment | | Test | Strength (ksi) | | Ductility (%) | |
| --- | --- | --- | --- | --- | --- | --- |
| Temperature (° C.) | Time (min) | temperature (° C.) | 0.2% Yield | Ultimate | Total elongation | Reduction of area |
| Fe—35 Cr[a] | | | | | | |
| 900 | 30 | 600 | 25.79 | 30.15 | 74.16 | 52.95 |
| Fe—35 Cr—1 Si[a] | | | | | | |
| 900 | 30 | 600 | 30.62 | 33.28 | 72.20 | 56.65 |
| Fe—35 Cr—2 Si[a] | | | | | | |
| 900 | 30 | 600 | 31.81 | 35.99 | 56.40 | 58.87 |
| Fe—35 Cr—3.0 Si[a] | | | | | | |
| 900 | 30 | 600 | 40.94 | 42.02 | 57.76 | 56.85 |
| Fe—35 Cr—2.5 Si[b] | | | | | | |
| 1100 | 30 | 600 | 37.22 | 43.11 | 20.90 | 29.25 |
| 1100 | 30 | 1000 | 3.15 | 3.25 | 109.30 | 72.80 |
| Fe—35 Cr—2.5 Si[c] | | | | | | |
| 1100 | 30 | 600 | 43.56 | 52.08 | 15.06 | 27.71 |
| 1100 | 30 | 1000 | 2.42 | 2.47 | 109.46 | 58.29 |
| Fe—35 Cr—2.5 Si—2 Mo—0.13 Ti—0.03 C[a] | | | | | | |
| 1100 | 30 | 600 | 46.32 | 54.18 | 26.10 | 32.00 |
| 1100 | 30 | 1000 | 9.37 | 10.59 | 69.90 | 48.78 |

[a]Drop-cast heat (approixmate 1-lb size).
[b]Vacuum-induction-melted heat (approximate 15-lb size).
[c]Air-induction-melted heat (approximate 15-lb size).

The tensile properties at 600 and 1000° C. for three alloys tested after treatment at 1100° C. for 30 min are compared in FIGS. 31 through 34. The alloys included in the comparison are the VIM and AIM Fe-35 Cr-2.5 Si alloys and the drop-cast Fe-35 Cr- 2.5 Si-2 Mo-1.30 Ti-0.03 C. The following observations can be made from FIGS. 31 through 34:

1. At a test temperature of 600° C., the low nitrogen containing VIM Fe-35 Cr-2.5 Si alloy has the lowest yield strength. The pick-up of nitrogen in the same alloy from the AIM results in higher values of yield strength. The higher values are presumably a consequence of fine distribution of chromium nitride that forms by the pick-up of nitrogen in the AIM alloy. The addition of molybdenum, titanium, and carbon with low nitrogen content, because of melting under argon (drop casting), results in significant increase in yield strength at 600° C. as compared to the lowest nitrogen heat and some increase as compared to nitrogen containing composition. The increase in yield strength results from a combination of three factors: (a) decrease in grain size from TiC precipitation, (b) precipitation strengthening from the presence of fine TiC particles, and (c) solid-solution strengthening from the addition of 2 wt % Mo. At 1000° C., the low nitrogen containing heat of Fe-35 Cr-2.5 Si alloy has higher yield strength than the higher nitrogen containing heat. At 1000° C., Si alloys. The substantial increase in yield strength of Fe-35 Cr-2.5 Si-2 Mo-0.13 Ti-0.03 C alloy, irrespective of its very fine grain size (FIG. 22), is believed to be a direct consequence of solid-solution strengthening from the molybdenum addition and the presence of TiC particles. If the grain size of this alloy could be increased through selective heat treatment, there is potential for further increase in its strength at 1000° C.

2. Ultimate tensile strength data follows the same trend as yield strength at 600 and 1000° C., and the same observed differences are related to the same reasoning as noted above for the yield strength.

3. Total elongation and reduction of area values are very high for all alloys at 600 and 1000° C. In general, the increase in strength is associated with a corresponding decrease in ductility (total elongation and reduction of area) values.

Oxidation Studies

One of the drivers for developing Fe—Cr—Si compositions is the need for high-temperature oxidation resistance. Samples of Fe-35 Cr and Fe-35 Cr-1 Si, Fe-35 Cr-2 Si, and Fe-35 Cr-3 Si were subjected to air oxidation at 800 and 1000° C. In each case, samples were taken periodically, cooled to room temperature, and their weight change was measured. Because they were cooled, frequently, the oxidation tests are more typical of cyclic oxidation. The weight change plots at 800 and 1000° C. are shown in FIGS. 35 and 36. These data show the following:

1. At 800° C., oxidation process is a oxide scale growth process with no spallation during the cool down cycles. The Fe-35 Cr alloy showed the highest weight gain. Addition of even 1% Si significantly reduced the oxidation kinetics. However, the increase in silicon from 1 to 3% did not produce a significant difference in oxidation kinetics.
2. At 1000° C., initial weight gain followed by weight loss is indicative of oxide spallation. It is important to note that Fe-35 Cr continues to spall with increasing time. However, the addition of silicon to Fe-35 Cr alloy reduces the spallation process. The plot at 1000° C. also shows that 3% Si is better than 1 and 2% Si in reducing the spallation process.

It is the improvement in oxidation resistance by silicon addition that led to the development of Fe-35 Cr—Si alloys. Further motive of the development was to optimize a the silicon addition to Fe-35 Cr to produce an alloy with a good combination of mechanical properties and processability.

Welding

The air-melted high nitrogen containing Fe-35 Cr-2.5 Si alloy was welded as follows:

The welding was done by the gas-tungsten-arc process. Sheets of 0.1 to 0.15-in. thickness were welded. The filler wire was also produced from the air-melted high nitrogen Fe-35 Cr-2.5 Si alloy. Welds were made to produce welded tubing. No preheat or postheat was needed. The next series of welds were made between the Fe-35 Cr-2.5 Si and carbon steel. Once again, the filler wire was of the Fe-35 Cr-2.5 Si composition and from the high nitrogen air-melted heat. No pre- or postweld heat treatment was required for welding Fe-35 Cr-2.5 Si alloy to carbon steel. In all cases, the weld beads were of exceptionally good quality, and there were no problems in grinding the welds to make them smooth.

It is thus seen that the above invention provides a novel iron base alloy having exceptional combination of mechanical properties, and oxidation resistance, with ease of processing and welding.

Effect of various alloying elements in Fe—Cr—Si alloys of this invention:

- Cr Added to Fe to improve its aqueous corrosion resistance. Its addition also significantly improves the high temperature oxidation resistance
- Si Added to Fe to improve its high temperature oxidation resistance. Its addition to Fe—Cr base further improves its high oxidation resistance.
- Mo Added to Fe—Cr and Fe—Cr—Si base to improve the pitting resistance in aqueous solution.
- Ti&C Are added in the ratio to form TiC precipitates for grain refinement.
- N High Cr alloys pickup nitrogen during air melting. This causes its formation of $Cr_2N$ precipitate which refines the grain size of the alloy.

What is claimed is:

1. A highly oxidation and corrosion resistance iron-base alloy comprising:
   Cr 35–50% wt.,
   Si of greater than 1% wt.,
   Mo up to 2% wt.,
   Ti 0.1–0.3 wt. %,
   C up to 0.03% wt.
2. The alloy of claim 1 with chromium ranging from 35–50% wt.
3. The alloy of claim 1 with chromium of 35% wt and containing Si of greater than 1% to 3% wt.
4. The alloy of claim 1 with chromium of 35% wt., silicon of 2.5% wt. and Mo up to 2% wt.
5. The alloy of claim 1 with chromium of 35% wt., silicon of 2.5% wt., Mo of 2% wt. and Ti 0.1 to 0.13% wt., and C up to 0.03% wt.
6. The alloy of claim 1 with chromium of 35% wt., silicon of 2.5% wt., Mo of 2% wt., and Ti of 0.13% wt., and C of 0.03% wt. to form TiC for grain refinement.
7. The process of welding the alloy of claim 1 in air wherein the subsequent welded alloy contains up to 0.1% wt. nitrogen.
8. Process of forming the alloy of claim 1 comprising vacuum induction melting.
9. The alloy of claim 1 wherein room temperature yield strength is increased from 53 to 74 KSi by increasing Si from greater than 1% to 3% wt. of ultimate tensile strength from 72 to 90 Ksi and drop in ductility from 29 to 3%.
10. The alloy of claim 1 wherein yield and ultimate tensile strength Fe-35Cr-2.5Si alloy can be increased by nearly three fold by cold working.
11. The alloy of claim 10 wherein Fe-35 Cr-2.5 Si retains its strength value at annealing temperatures up to 500° C.
12. The alloy of claim 11 wherein annealing temperatures of 780° C. result in strength values typical of annealed material with essentially no change in properties up to annealing temperatures of 1100° C.
13. The alloy of claim 1 wherein an annealing temperature of 1100° C. for 30 minutes reduces scatter and improves ductilities of Fe-35Cr-3Si and Fe-35Cr-1.5-Si-2Mo-0.03C-0.13Ti and Fe-35Cr-2.5Si-2Mo-0.03C-0.13Ti.
14. The alloy of claim 1 comprising Fe-35Cr-2.5Si that is weldable to itself by gas tungsten arc process and a filter wire of same alloy composition.
15. The Fe-35C-2.5Si alloy of claim 14 that is weldable to carbon steel by gas tungsten arc process and using a filler metal of Fe-35Cr-2.5Si composition.
16. The Fe—Cr—Si alloys of claim 1 wherein increase in Si from greater than 1% to 3% reduces the oxidation at 800° C. and oxide spallation in air at 1000° C.
17. The alloy of claim 1 having optimum oxidation resistance, weldability, and mechanical properties.
18. The alloy of claim 1 comprising Fe-35C-2.5-Si-2Mo-0.13Ti-0.03C having optimum pitting resistance in a aqueous environment and oxidation resistance as well as weldability and mechanical properties.

* * * * *